United States Patent
Kang et al.

(10) Patent No.: US 11,229,029 B2
(45) Date of Patent: Jan. 18, 2022

(54) METHOD FOR TRANSMITTING PHYSICAL UPLINK CONTROL CHANNEL IN WIRELESS COMMUNICATION SYSTEM, AND DEVICE THEREFOR

(71) Applicant: LG Electronics Inc., Seoul (KR)

(72) Inventors: Jiwon Kang, Seoul (KR); Ilmu Byun, Seoul (KR); Hanbyul Seo, Seoul (KR); Minki Ahn, Seoul (KR); Joonkui Ahn, Seoul (KR); Suckchel Yang, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 16/473,746

(22) PCT Filed: Jan. 3, 2018

(86) PCT No.: PCT/KR2018/000076
§ 371 (c)(1),
(2) Date: Jun. 26, 2019

(87) PCT Pub. No.: WO2018/128365
PCT Pub. Date: Jul. 12, 2018

(65) Prior Publication Data
US 2021/0136768 A1    May 6, 2021

Related U.S. Application Data

(60) Provisional application No. 62/442,951, filed on Jan. 5, 2017.

(51) Int. Cl.
*H04W 72/04* (2009.01)
*H04W 72/12* (2009.01)

(52) U.S. Cl.
CPC ..... *H04W 72/0493* (2013.01); *H04W 72/0413* (2013.01); *H04W 72/0466* (2013.01); *H04W 72/1268* (2013.01)

(58) Field of Classification Search
None
See application file for complete search history.

(56) References Cited

U.S. PATENT DOCUMENTS

| 2013/0315321 A1 | 11/2013 | Rajagopal et al. |
| 2015/0230263 A1 | 8/2015 | Roy et al. |

(Continued)

FOREIGN PATENT DOCUMENTS

| CN | 102083181 A | 6/2010 |
| CN | 101800620 A | 8/2010 |

(Continued)

OTHER PUBLICATIONS

U.S. Appl. No. 62/401,128, filed Sep. 28, 2016 (Year: 2016).*

(Continued)

*Primary Examiner* — Jeffrey M Rutkowski
*Assistant Examiner* — Basil Ma
(74) *Attorney, Agent, or Firm* — Dentons US LLP

(57) ABSTRACT

The present specification provides a method for transmitting a PUCCH in a wireless communication system. The method for a terminal transmitting a PUCCH, according to the present specification, comprises a step for transmitting a PUCCH to a base station by using a plurality of uplink beams, wherein the PUCCH is transmitted via uplink beams that are different per specific resource unit, wherein the specific resource unit may represent a resource unit for transmitting the PUCCH by the same beams.

8 Claims, 14 Drawing Sheets

(56) References Cited

U.S. PATENT DOCUMENTS

| | | | |
|---|---|---|---|
| 2018/0092156 A1* | 3/2018 | Kim | H04W 72/0406 |
| 2018/0359790 A1* | 12/2018 | Ingale | H04W 28/16 |
| 2019/0222279 A1* | 7/2019 | Xi | H04W 72/00 |

FOREIGN PATENT DOCUMENTS

| | | |
|---|---|---|
| CN | 102035631 A | 4/2011 |
| CN | 102281593 A | 12/2011 |
| WO | 2013/058612 A1 | 4/2013 |

OTHER PUBLICATIONS

R1-1611994 3GPP TSG-RAN WG1 #87 Intel "UL control channel design with short duration" Nov. 14-18, 2016 (Year: 2016).*

R1-1612496 3GPP TSG-RAN WG1 #87 Samsung "UL beam management RS" Nov. 14-18, 2016 (Year: 2016).*

R1-1611840 3GPP TSG-RAN WG1 #87 LG "Overall structure of UL control channel for NR" (Year: 2016).*

ZTE, "NR UL control channel structure", 3GPP TSG RAN WG1 Meeting #87, Nov. 14-18, 2016, R1-1611291.

Samsung, "UL beam management RS", 3GPP TSG RAN WG1 #87, Nov. 14-18, 2016, R1-1612496.

Intel Corporation, "UL Control Channel Design with Short Duration," R1-1611994, 3GPP TSG RAN WG1 Meeting #87, Reno, USA, Nov. 6, 2016, see section 3 and figure 5.

Nokia et al., "On the PUCCH Structure for NR," R1-1612238, 3GPP TSG RAN WG! Meeting #87, Reno, USA, Nov. 5, 2016, see section 3 and figure 4.

LG Electronics, "Overall Structure of UL Control Channel for NR," R1-1611840, 3GPP TSG RAN WG1 Meeting #87, Reno, USA, Nov. 5, 2016, see section 3-4.3.

ZTE Corporation et al., "Discussion on Control Channel Design for NR MIMO," R1-166217, 3GPP TSG RAN WG1 Meeting #86, Gothenburg, Swedent, Aug. 13, 2016, see sections 2-5.

* cited by examiner

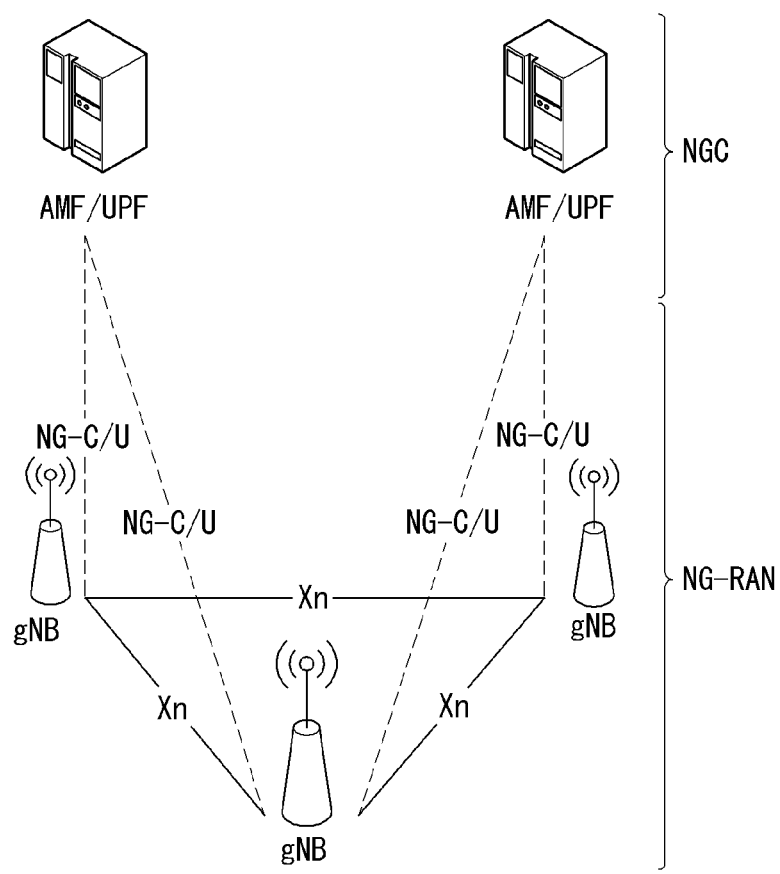
[Figure 1]

[Figure 2]
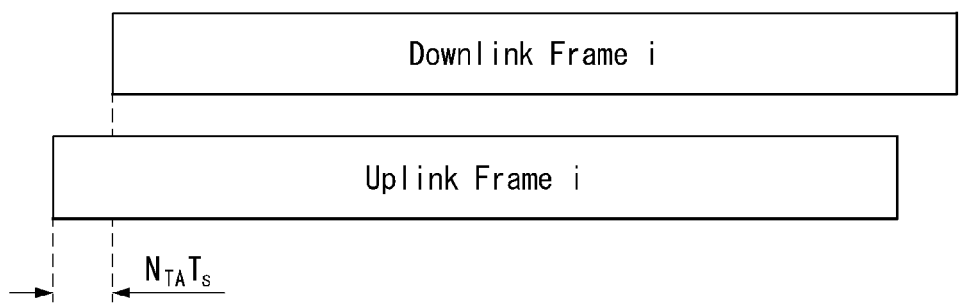

[Figure 3]
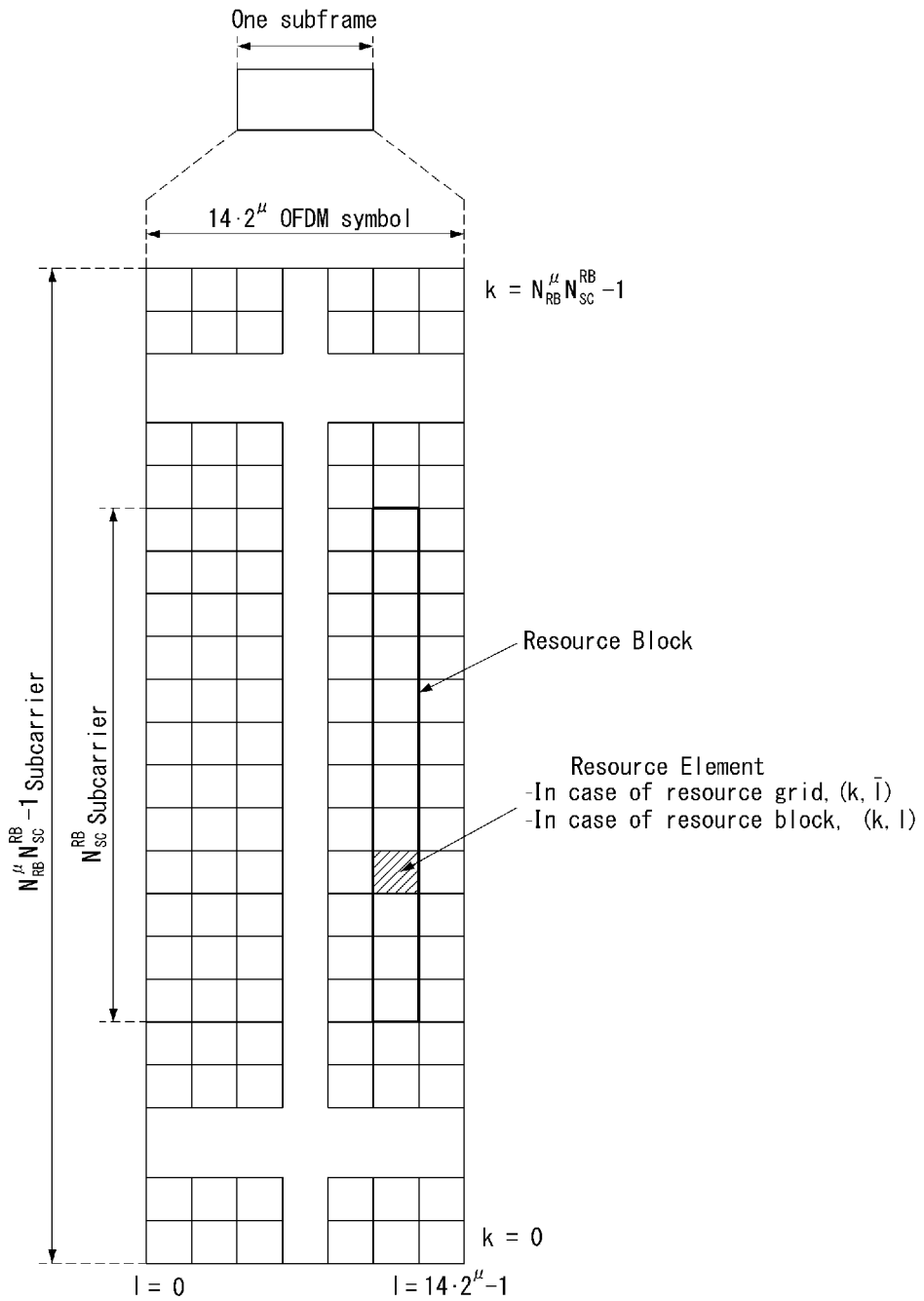

[Figure 4]
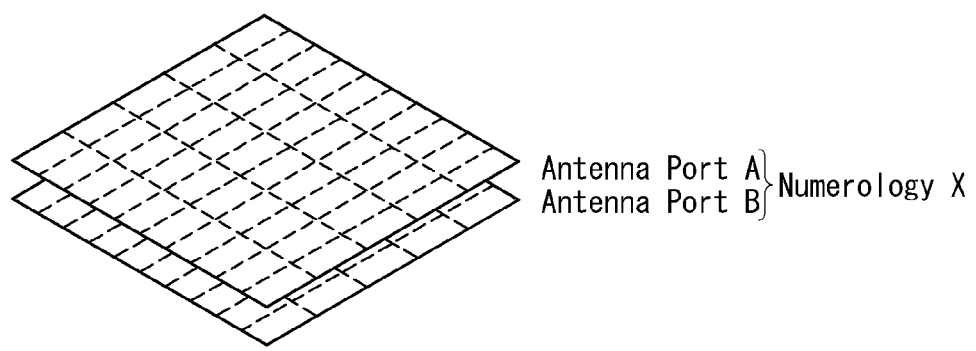
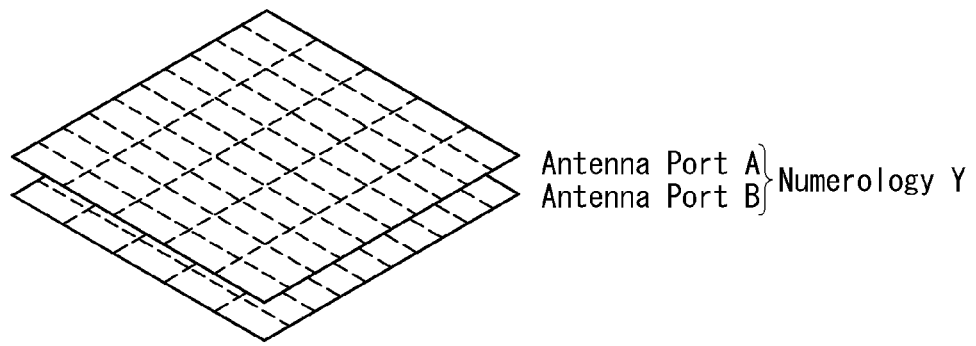

[Figure 5]
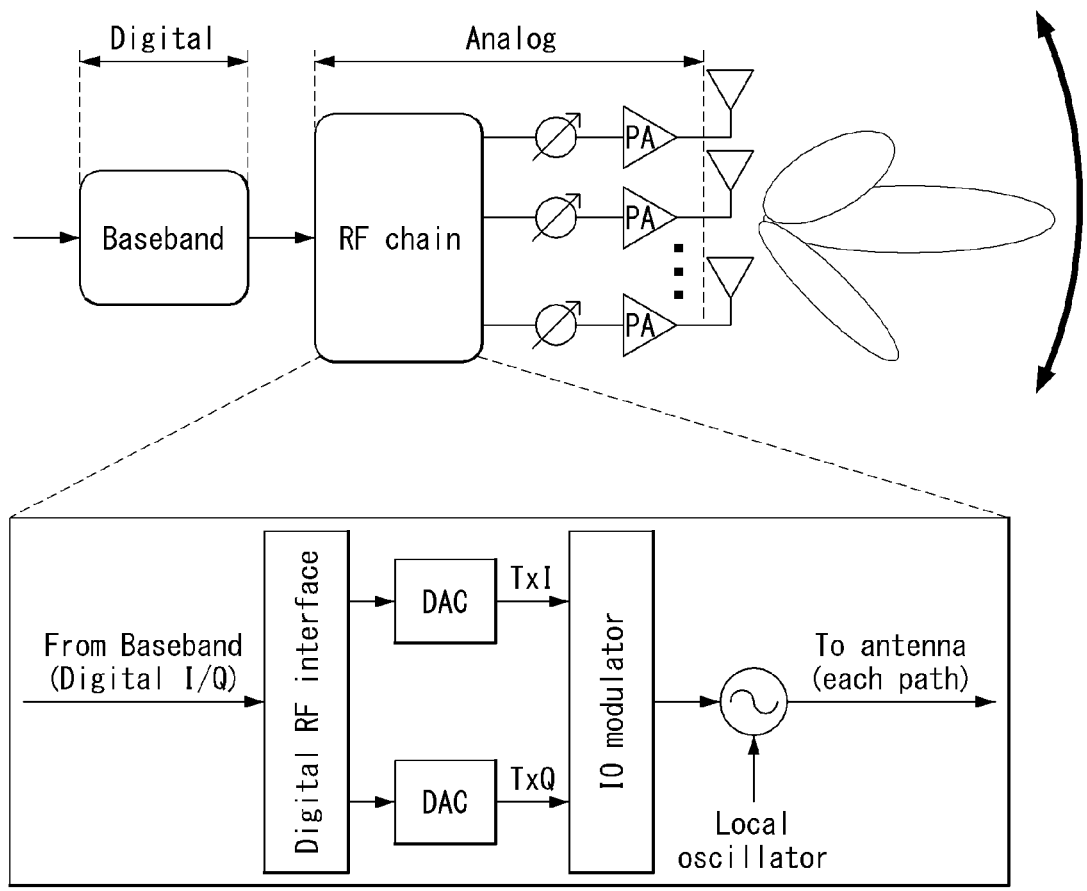

[Figure 6]
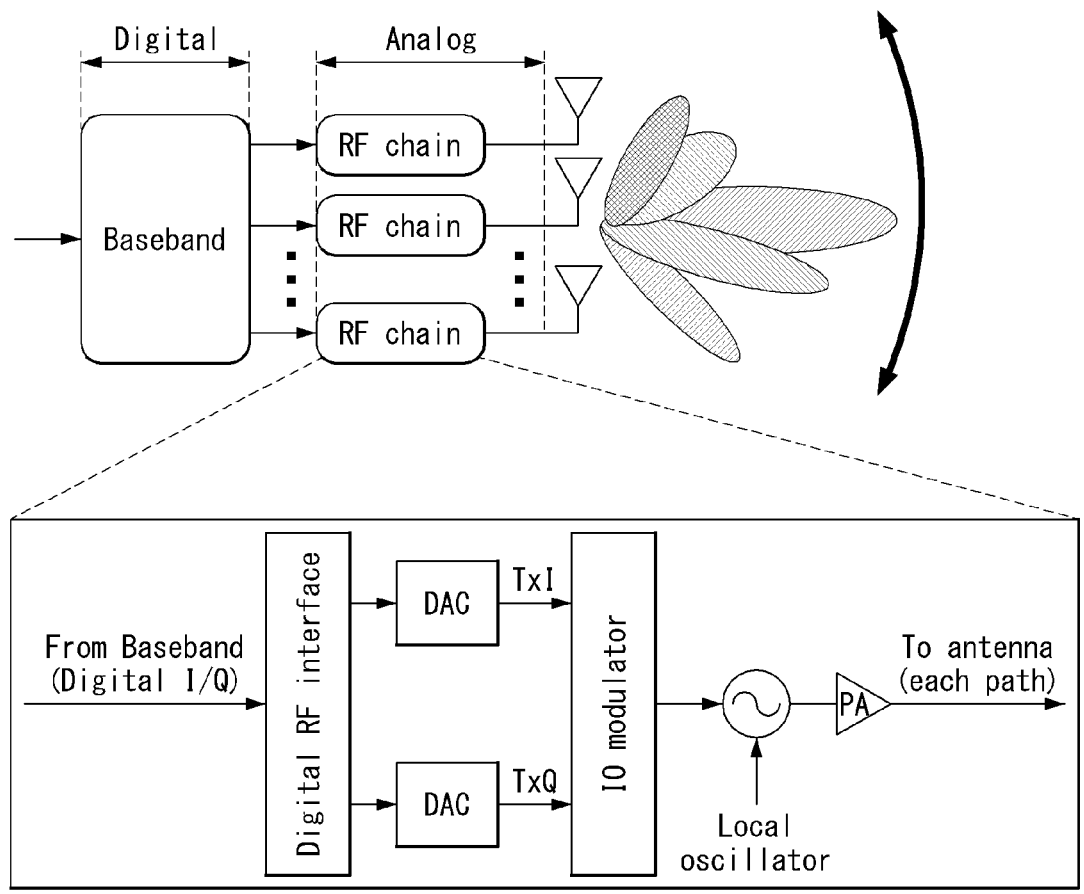

[Figure 7]
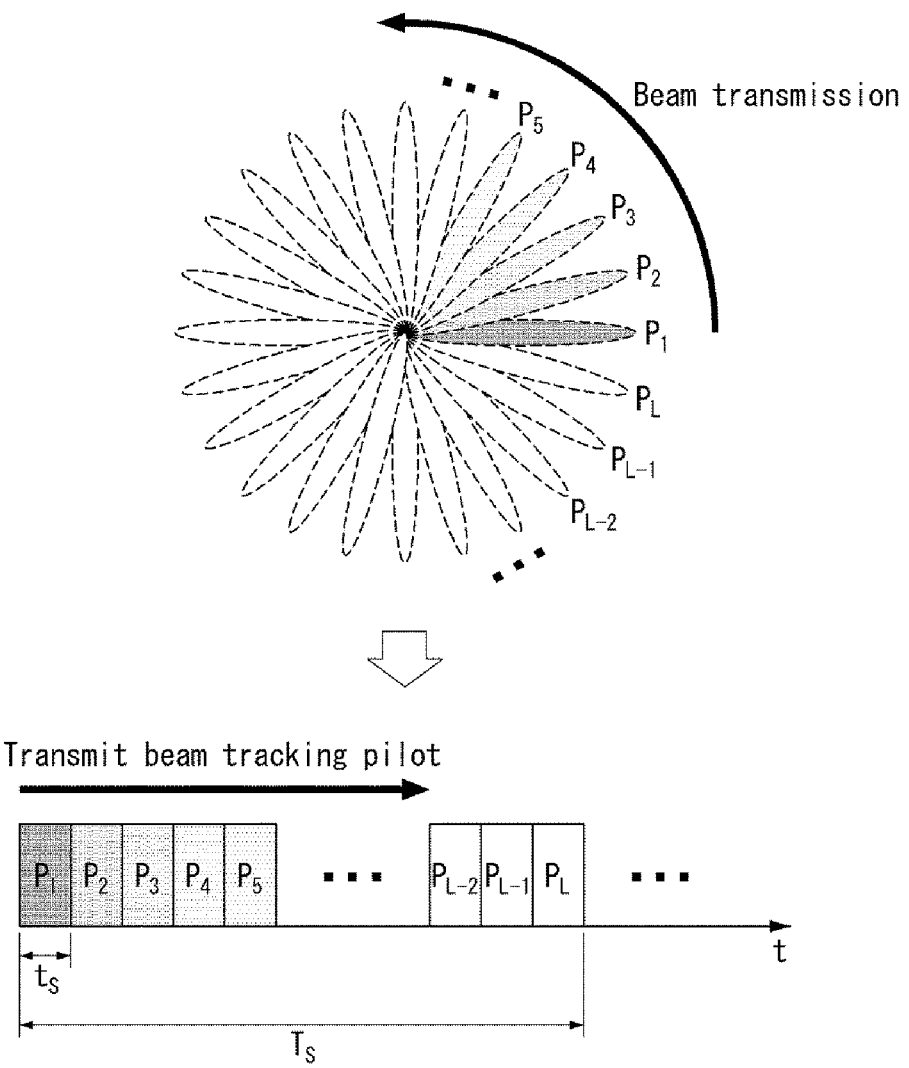

【Figure 8】

| PUSCH CQI Feedback type | | PMI Feedback Type | |
|---|---|---|---|
| | | No PMI (OL, TD, single-antenna) | With PMI (CL) |
| Wideband (Wideband CQI) | | | Mode 1-2: Multiple PMI<br>RI<br>1st wideband CQI (4bit)<br>2nd wideband CQI (4bit) if RI>1<br>Subband PMIs on each subband |
| UE Selected (subband CQI) | | Mode 2-0<br>RI (only for Open-loop SM)<br>Wideband CQI (4bit)+Best-M CQI (2bit)<br>Best-M index<br>when RI>1, CQI of first codeword | Mode 2-2: Multiple PMI<br>RI<br>1st wideband CQI (4bit)+Best-M CQI (2bit)<br>2nd wideband CQI (4bit)+Best-M CQI (2bit) if RI>1<br>Wideband PMI  Best-M PMI<br>Best-M index |
| Higher layer-configured (subband CQI) | | Mode 2-0<br>RI (only for Open-loop SM)<br>Wideband CQI (4bit)+subband CQI (2bit)<br>when RI>1, CQI of first codeword | Mode 3-1: Single PMI<br>RI<br>1st wideband CQI (4bit)+subband CQI (2bit)<br>2nd wideband CQI (4bit)+subband CQI (2bit) if RI>1<br>Wideband PMI |

[Figure 9]

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-loop SM) ]<br>One wideband CQI (4bit) ]<br>when RI>1, CQI of first codeword | Mode 1-1<br>RI ]<br>Wideband CQI (4bit)<br>Wideband spatial CQI (3bit) for RI>1 ]<br>Wideband PMI (4bit) |
| | UE Selected | Mode 2-0<br>RI (only for Open-loop SM) ]<br>Wideband CQI (4bit)<br>Best-1 CQI (4bit) in each BP<br>Best-1 indicator (L-bit label) ]<br>when RI>1, CQI of first codeword | Mode 2-1<br>RI ]<br>Wideband CQI (4bit)<br>Wideband spatial CQI (3bit) for RI>1 ]<br>Wideband PMI (4bit)<br>Best-1 CQI (4bit) 1 in each BP<br>Best-1 spatial CQI (3bit) for RI>1 ]<br>Best-1 indicator (L-bit label) |

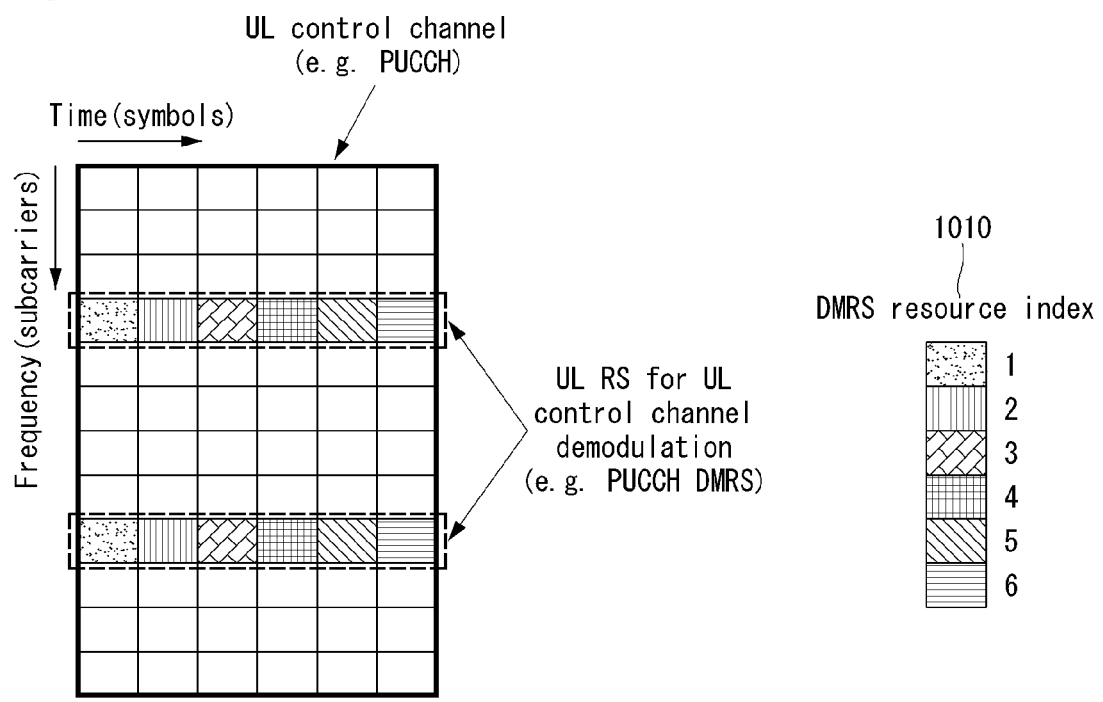

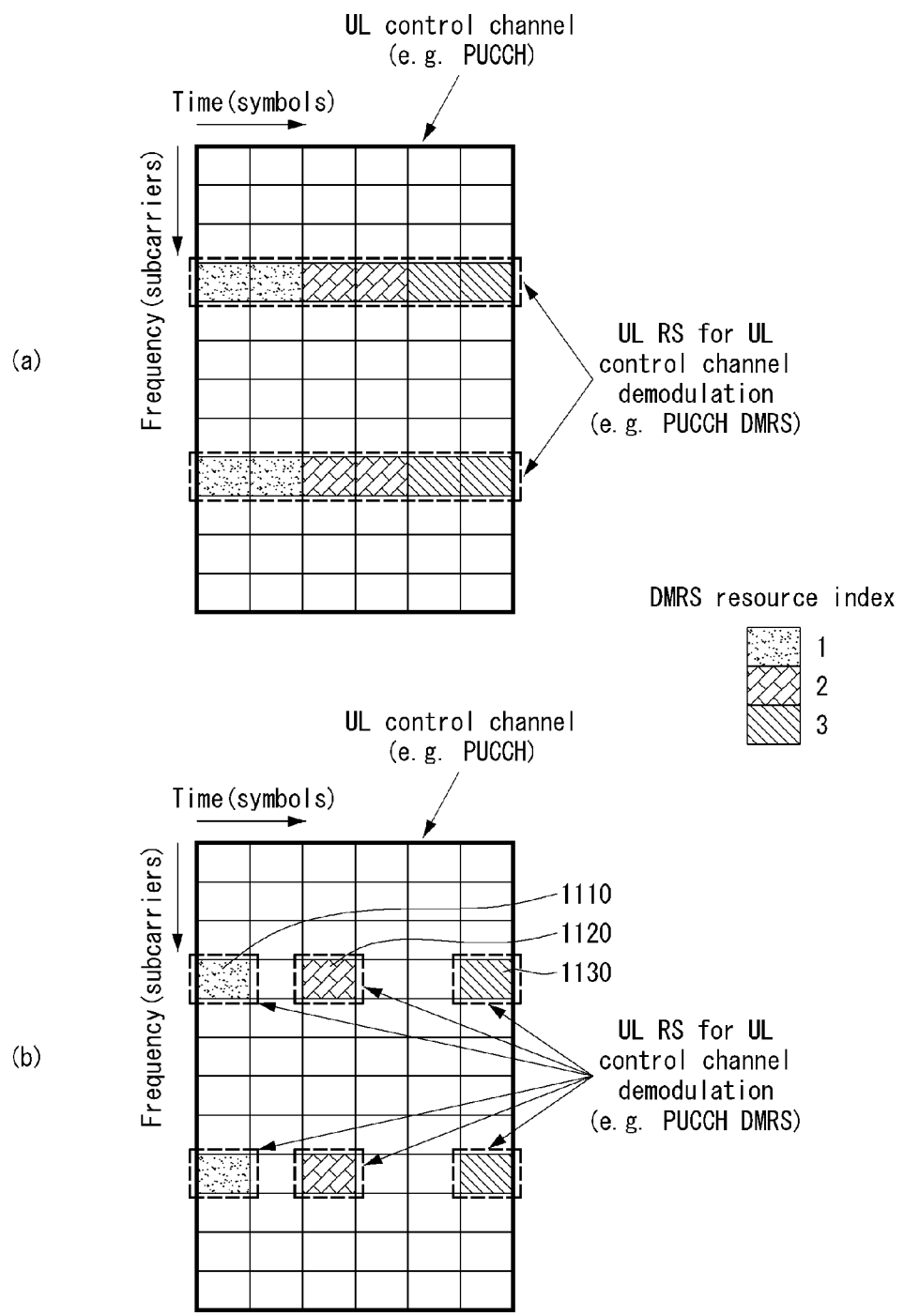
[Figure 11]

【Figure 12】
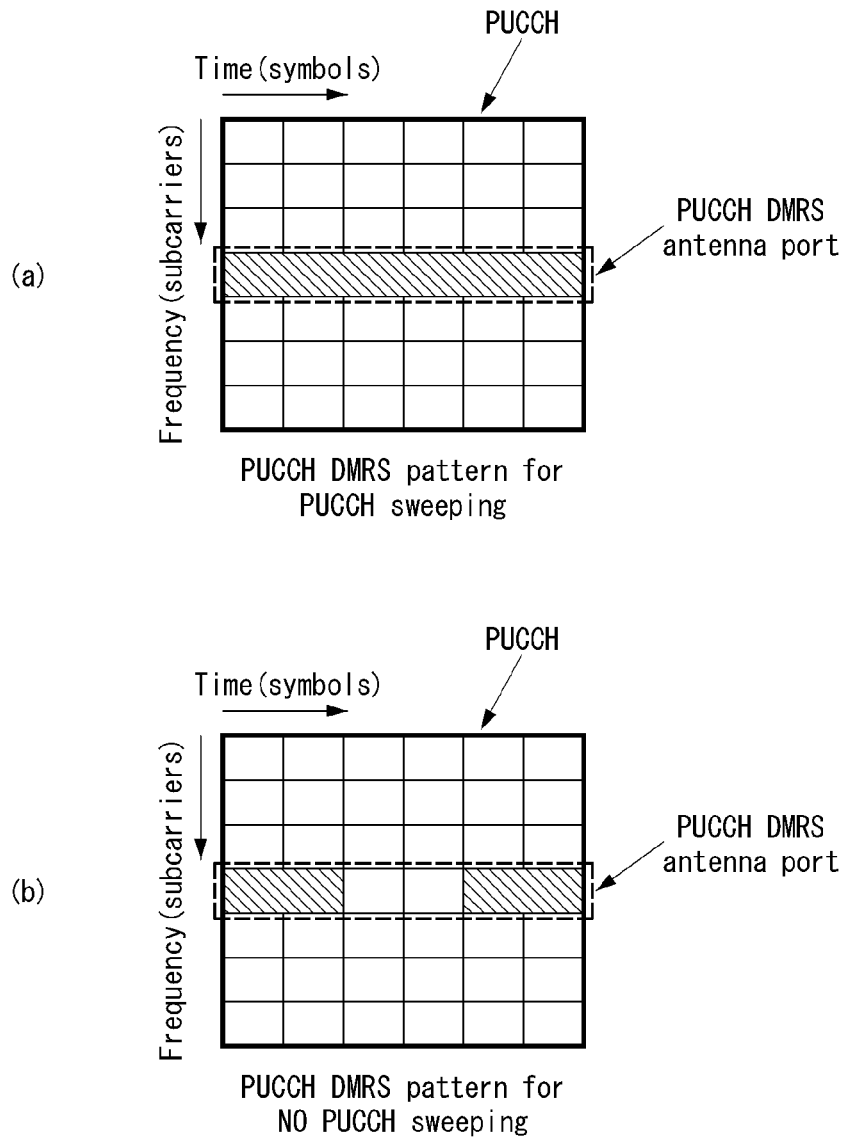
【Figure 13】
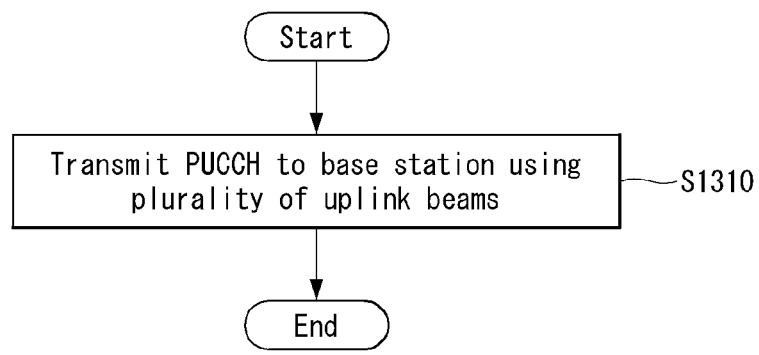

[Figure 14]
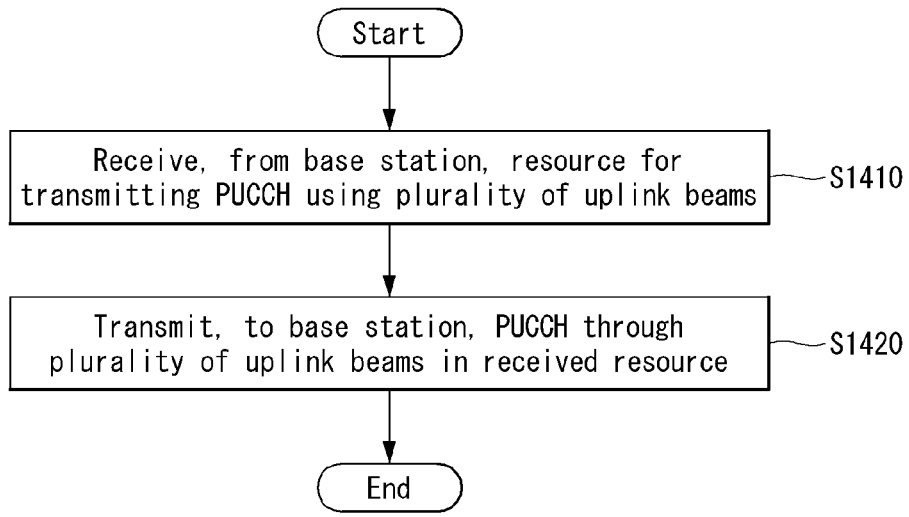
[Figure 15]
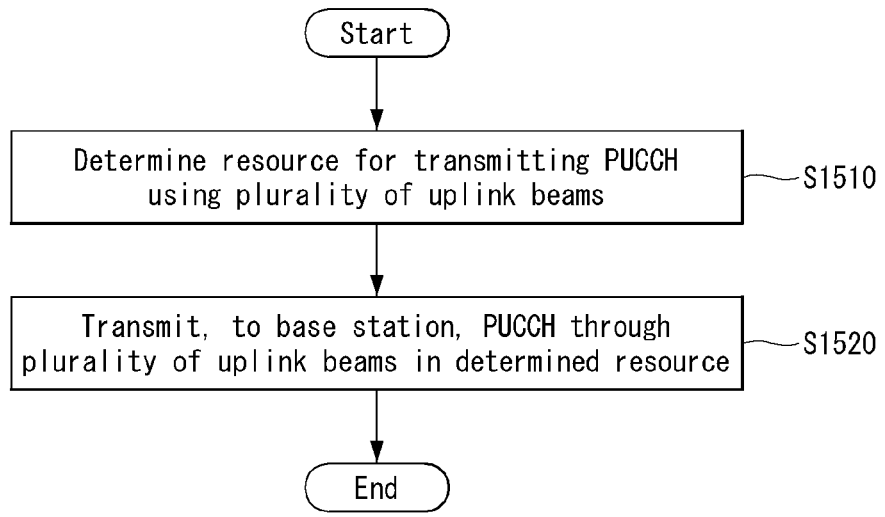

【Figure 16】
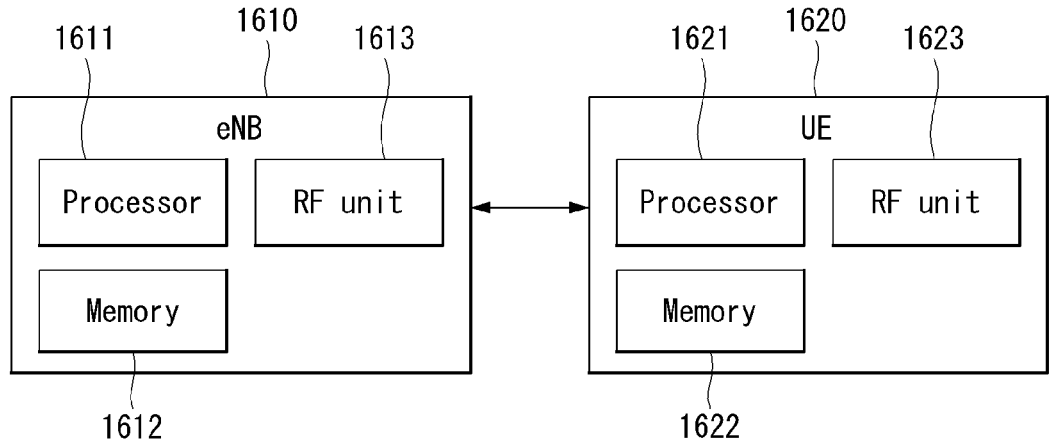
【Figure 17】
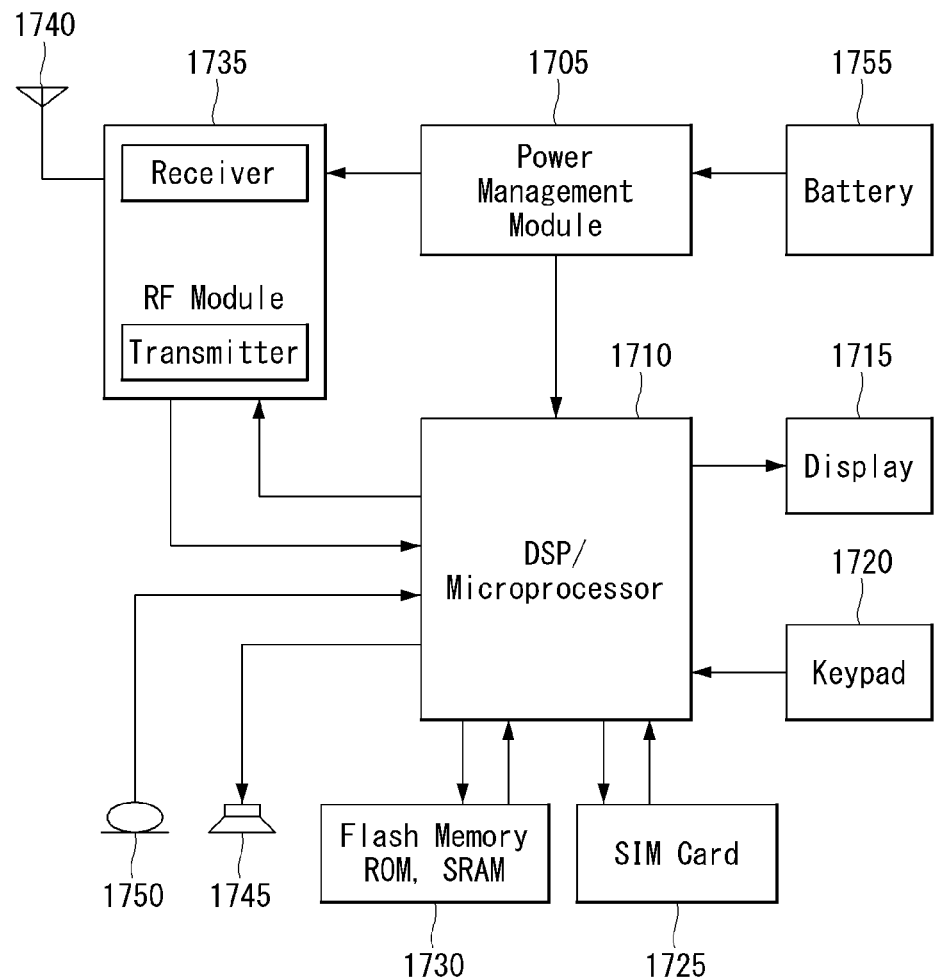

METHOD FOR TRANSMITTING PHYSICAL UPLINK CONTROL CHANNEL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2018/000076, filed on Jan. 3, 2018, which claims the benefit of U.S. Provisional Application No. 62/442,951 filed on Jan. 5, 2017, the contents of which are all hereby incorporated by reference herein in their entirety.

TECHNICAL FIELD

The present invention relates to a wireless communication system and, more particularly, to a method of transmitting a physical uplink control channel and a device supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

This specification provides a method of transmitting a PUCCH using a plurality of uplink beams.

Furthermore, this specification provides a method of configuring a PUCCH and a PUCCH demodulation reference signal (DMRS) using at least one of the number of transmission beams of a PUCCH or whether sweeping has been applied to PUCCH transmission.

Technical objects to be achieved in the present invention are not limited to the above-described technical objects, and other technical objects not described above may be evidently understood by a person having ordinary skill in the art to which the present invention pertains from the following description.

Technical Solution

This specification provides a method of transmitting a physical uplink control channel (PUCCH) carrying uplink control information (UCI) in a wireless communication system. The method performed by a UE includes transmitting, to a base station (BS), the PUCCH using a plurality of uplink beams. The PUCCH is transmitted through a different uplink beam for each resource unit. The specific resource unit includes one or more symbols, and indicates a resource unit by which the PUCCH is transmitted using the same beam.

Furthermore, the method further includes transmitting, to the BS, a resource signal (RS) used for a demodulation of the PUCCH using the plurality of uplink beams. The resource of the reference signal (RS) is mapped for each resource unit.

Furthermore, in this specification, the resource of the reference signal is mapped to all resources or specific resource of the specific resource unit.

Furthermore, in this specification, in the specific resource unit, the uplink beam used for the transmission of the reference signal and the uplink beam used for the transmission of the PUCCH are identical.

Furthermore, in this specification, a PUCCH symbol to which the uplink control information is mapped is determined based on a coding rate used for the uplink control information.

Furthermore, in this specification, when the coding rate used for the uplink control information is high, the uplink control information is first mapped to a symbol(s) of a first specific resource unit of the PUCCH resource, and the mapped symbol(s) is continuously repeated and mapped to the PUCCH resource.

Furthermore, in this specification, when the coding rate used for the uplink control information is low, the uplink control information is mapped to all symbols of the PUCCH resource.

Furthermore, in this specification, the uplink control information is interleaved in a time region in all the symbols or specific symbol of the PUCCH resource.

Furthermore, in this specification, a specific part of the uplink control information is frequency first mapped starting from a pre-defined symbol position.

Furthermore, in this specification, the resource of the PUCCH and the resource of the reference signal are determined based on at least one of the number of beams in which the PUCCH is transmitted or whether the PUCCH has been swept.

Furthermore, in this specification, the resource of the PUCCH is at least one of a time resource, a frequency resource or a code resource to which the PUCCH is allocated.

Furthermore, in this specification, transmission power of the PUCCH is determined based on at least one of the number of beams in which the PUCCH is transmitted or whether the PUCCH has been swept.

Furthermore, in this specification, when the PUCCH is transmitted using the plurality of uplink beams, the transmission power of the PUCCH is differently configured for each resource unit.

Furthermore, in this specification, the uplink beam used for the PUCCH transmission for each resource unit is indicated by the BS or selected by the UE.

Furthermore, this specification provides a user equipment transmitting a physical uplink control channel (PUCCH) carrying uplink control information (UCI) in a wireless communication system. The user equipment includes a radio frequency (RF) module configured to transmit and receive radio signals and a processor functionally connected to the RF module. The processor is configured to transmit, to a base station (BS), the PUCCH using a plurality of uplink beams. The PUCCH is transmitted through a different uplink beam for each specific resource unit. The specific resource unit indicates a resource unit by which the PUCCH is transmitted using an identical beam.

Advantageous Effects

This specification has an effect in that it can reduce signaling overhead in a system and thus reduce communication latency by newly defining a PUCCH and PUCCH DMRS design or configuration for transmitting a PUCCH using a plurality of uplink beams.

Effects which may be obtained in the present invention are not limited to the above-described effects, and other technical effects not described above may be evidently understood by a person having ordinary skill in the art to which the present invention pertains from the following description.

DESCRIPTION OF DRAWINGS

The accompanying drawings, included as part of the detailed description in order to help understanding of the present invention, provide embodiments of the present invention and describe the technical characteristics of the present invention along with the detailed description.

FIG. 1 is a diagram showing an example of a general system structure of NR to which a method proposed in this specification may be applied.

FIG. 2 shows the relation between an uplink frame and a downlink frame in a wireless communication system to which a method proposed in this specification may be applied.

FIG. 3 shows an example of a resource grid supported in a wireless communication system to which a method proposed in this specification may be applied.

FIG. 4 shows examples of a resource grid for each antenna port and numerology to which a method proposed in this specification may be applied.

FIG. 5 shows an example of a block diagram of a transmitter configured with an analog beamformer and an RF chain.

FIG. 6 shows an example of a block diagram of a transmitter configured with a digital beamformer and RF chains.

FIG. 7 shows an example of an analog beam scanning method.

FIG. 8 is a diagram showing an example of a PUSCH CSI reporting mode.

FIG. 9 is a diagram showing an example of a PUCCH CSI reporting mode.

FIG. 10 is a diagram showing an example of the resource mapping of a multi-beam-based PUCCH DMRS proposed in this specification.

FIG. 11 is a diagram showing another example of the resource mapping of a multi-beam-based PUCCH DMRS proposed in this specification.

FIG. 12 is a diagram showing an example of the DMRS pattern of PUCCHs proposed in this specification.

FIG. 13 is a flowchart showing an example of a method of performing PUCCH transmission, which is proposed in this specification.

FIG. 14 is a flowchart showing another example of a method of performing PUCCH transmission, which is proposed in this specification.

FIG. 15 is a flowchart showing another example of a method of performing PUCCH transmission, which is proposed in this specification.

FIG. 16 illustrates a block diagram of a wireless communication device according to an embodiment of the present invention.

FIG. 17 illustrates a block diagram of a communication device according to an embodiment of the present invention.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP) or a generation NB (gNB). Furthermore, the terminal may be fixed or may have mobility and may be substituted with another term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical spirit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definitions of Terms eLTE eNB: eLTE eNB is an evolution of an eNB which supports a connection to EPC and NGC.

gNB: A node which supports not only a connection to NGC but also NR.

New RAN: A wireless access network which supports NR or E-UTRA or interacts with NGC.

Network slice: A network slice is a network defined by an operator to provide a solution optimized to a specific market scenario requiring specific requirements together with an end-to-end scope.

Network function: A network function is a logical node within network infrastructure having a well-defined external interface and a well-defined functional operation.

NG-C: A control plane interface used for an NG2 reference point between a new RAN and NGC.

NG-U: A user plane interface used for an NG3 reference point between a new RAN and NGC Non-standalone NR: A disposition configuration by which a gNB requires an LTE eNB as an anchor to establish a control plane connection to an EPC or by which a gNB requires an eLTE eNB as an anchor to establish a control plane connection to an NGC.

Non-standalone E-UTRA: A disposition configuration which requires a gNB as an anchor to establish a control plane connection to an NGC.

User plane gateway: An end-point of the NG-U interface.

System in General

FIG. 1 illustrates one example of the overall system structure of an NR to which a method proposed by the present specification may be applied.

Referring to FIG. 1, an NG-RAN is composed of an NG-RA user plane (a new AS sublayer/PDCP/RLC/MAC/PHY) and gNBs providing control plane (RRC) protocol endpoints for User Equipment (UE).

The gNBs are inter-connected through an Xn interface.

The gNBs are also connected to the NGC through the NG interface.

More specifically, the gNBs are connected to Access and Mobility Management Functions (AMFs) through the N2 interface and to User Plane Functions (UPFs) through the N3 interface.

New Rat (NR) Numerology and Frame Structure

In an NR system, multiple numerologies may be supported. In this case, numerology may be defined by a subcarrier spacing and cyclic prefix (CP) overhead. In this case, multiple subcarrier spacing may be derived by scaling default subcarrier spacing by an integer N (or μ). Furthermore, although it is assumed that a very low subcarrier spacing is not used in a very high carrier frequency, a used numerology may be selected independently of a frequency band.

Furthermore, in the NR system, various frame structures according to multiple numerologies may be supported.

Hereinafter, an orthogonal frequency division multiplexing (OFDM) numerology and frame structure which may be taken into consideration in the NR system are described.

Multiple OFDM numerologies supported in the NR system may be defined like Table 1.

TABLE 1

| μ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In relation to the frame structure in the NR system, the size of various fields in the time domain is represented as a multiple of a time unit of $T_s=1/(\Delta f_{max} \cdot N_f)$. In this case, $\Delta f_{max}=480 \cdot 10^3$, and $N_f=4096$. downlink and uplink transmission is configured with a radio frame having a period of $T_f=(\Delta f_{max} N_f/100) \cdot T_s=10$ ms. In this case, the radio frame is configured with 10 subframes, each one having a period of $T_{sf}=(\Delta f_{max} N_f/1000) \cdot T_s=1$ ms. In this case, a set of frames for uplink and a set of frames for downlink may be present.

FIG. 2 shows the relation between an uplink frame and a downlink frame in a wireless communication system to which a method proposed in this specification may be applied.

As shown in FIG. 2, the transmission of an uplink frame number i from a user equipment (UE) needs to start prior to $T_{TA}=N_{TA}T_s$ compared to the start of a corresponding downlink frame in the corresponding UE.

With respect to a numerology μ, slots are numbered in order of increasing $n_s^\mu \in \{0, \ldots, N_{subframe}^{slots, \mu}-1\}$ within a subframe and are numbered in order of increasing $n_{s,f}^\mu \in \{0, \ldots, N_{frame}^{slots, \mu}-1\}$ within a radio frame. One slot is configured with $N_{symb}^\mu$ contiguous OFDM symbols. $N_{symb}^\mu$ is determined based on a used numerology and a slot configuration. In the subframe, the starts of the slots $n_s^\mu$ are temporally aligned with the start of an OFDM symbol $n_s^\mu N_{symb}^\mu$ in the same subframe.

All UEs cannot perform transmission and reception at the same time, which means that all the OFDM symbols of a downlink slot or an uplink slot cannot be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots, \mu}$ | $N_{subframe}^{slots, \mu}$ | $N_{symb}^{\mu}$ | $N_{frame}^{slots, \mu}$ | $N_{subframe}^{slots, \mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

In relation to a physical resource in the NR system, an antenna port, a resource grid, a resource element, a resource block, a carrier part, etc. may be taken into consideration.

Hereinafter, the physical resources which may be taken into consideration in the NR system are described specifically.

First, in relation to the antenna port, the antenna port is defined so that a channel in which a symbol on an antenna port is carried is deduced from a channel in which a different symbol on the same antenna port is carried. If the large-scale property of a channel in which a symbol on one antenna port is carried is deduced from a channel in which a symbol on a different antenna port is carried, the 2 antenna ports may be said to have a quasi co-located or quasi co-location (QL/QCL) relation. In this case, the large-scale property includes one or more of delay spread, Doppler spread, a frequency shift, average received power, or received timing.

FIG. 3 shows an example of a resource grid supported in a wireless communication system to which a method proposed in this specification may be applied.

Referring to FIG. 3, a resource grid has been illustrated as being configured with $N_{RB}^{\mu}N_{sc}^{RB}$ subcarriers on a frequency domain, and one subframe has been illustrated as being configured with 14·2$\mu$ OFDM symbols, but is not limited thereto.

In the NR system, a transmitted signal is described by one or more resource grids configured with $N_{RB}^{\mu}N_{sc}^{RB}$ subcarriers and OFDM symbols of $2^{\mu}N_{symb}^{(\mu)}$. In this case, $N_{RB}^{\mu} \leq N_{RB}^{max, \mu}$. The $N_{RB}^{max, \mu}$ indicates a maximum transmission bandwidth, which may be different between numerologies and between the uplink and the downlink.

In this case, as in FIG. 4, one resource grid is configured for each numerology $\mu$ and each antenna port p.

FIG. 4 shows examples of a resource grid for each antenna port and numerology to which a method proposed in this specification may be applied.

Each element of the resource grid for the numerology $\mu$ and the antenna port p is denoted as a resource element, and is uniquely identified by an index pair (k, l̄). In this case, k=0, ..., $N_{RB}^{\mu}N_{sc}^{RB}-1$ is an index on a frequency domain, and l̄=0, ..., $2^{\mu}N_{symb}^{(\mu)}-1$ indicates the location of a symbol within a subframe. When a resource element is denoted in a slot, the index pair (k, l) is used. In this case, l=0, ..., $N_{symb}^{\mu}-1$.

The resource element (k, l̄) for the numerology $\mu$ and the antenna port p corresponds to a complex value $a_{k, \bar{l}}^{(p, \mu)}$. If there is danger of confusion or if a specific antenna port or numerology is not specified, the indices p and $\mu$ may be dropped. As a result, the complex value may become $a_{k, \bar{l}}^{(p)}$ or $a_{k, \bar{l}}$.

Furthermore, a physical resource block is defined as $N_{sc}^{RB}=12$ contiguous subcarriers on the frequency domain. The physical resource blocks are numbered from 0 to $N_{RB}^{\mu}-1$ on the frequency domain. In this case, the relation between a physical resource block number $n_{PRB}$ and resource elements (k, l) on the frequency domain is given like Equation 1.

$$n_{PRB} = \left\lfloor \frac{k}{N_{sc}^{RB}} \right\rfloor \quad \text{[Equation 1]}$$

Furthermore, in relation to the carrier part, a UE may be configured to perform transmission or reception using only a subset of a resource grid. In this case, a set of resource blocks configured to be received or transmitted by the UE is numbered from 0 to $N_{URB}-1$ on the frequency domain.

Uplink Control Channel

Physical uplink control signaling needs to carry at least hybrid-ARQ acknowledgement, CSI reporting (including beamforming information, if possible), and a scheduling request.

At least two transmission methods are supported for an UL control channel supported in the NR system.

An UL control channel may be transmitted in short duration around an uplink symbol(s) transmitted as the last of a slot. In this case, the UL control channel is time-division-multiplexed and/or frequency-division-multiplexed with an uplink data channel within the slot. 1 symbol unit transmission of a slot is supported for an UL control channel of short duration.

Short uplink control information (UCI) and data is frequency-division-multiplexed in a UE and between UEs if physical resource blocks (PRB) for short UCI and data do not overlap at least.

In order to support time division multiplexing (TDM) of short PUCCHs from different UEs within the same slot, a mechanism for notifying a UE whether a symbol(s) within a slot that will transmit a short PUCCH is supported at least 6 GHz or more is supported.

At least 1) when a reference signal (RS) is multiplexed, UCI and the RS are multiplexed with a given OFDM symbol according to a frequency division multiplexing (FDM) method and 2) subcarrier spacing between downlink (DL)/uplink (UL) data and a PUCCH of short duration in the same slot is supported for 1 symbol duration.

At least a PUCCH of short duration in 2-symbol duration of a slot is supported. In this case, subcarrier spacing between downlink (DL)/uplink (UL) data and a PUCCH of short duration in the same slot is the same.

At least a semi-static configuration that may be time-division multiplexed within given duration in a slot is supported for the PUCCH resource of a given UE within a slot, that is, short PUCCHs of different UEs.

A PUCCH resource includes a time domain, a frequency domain, and a code domain, if it is applicable.

A PUCCH of short duration may be extended up to the end of a slot in the UE viewpoint. In this case, after a PUCCH of short duration, an explicit gap symbol is unnecessary.

If data is scheduled in a short UL part with respect to a slot (i.e., DL-centric slot) having a short UL part, 'short UCI' and data may be frequency-division-multiplexed by one UE.

An UL control channel may be transmitted in long duration over multiple uplink symbols in order to improve coverage. In this case, the UL control channel is frequency-division-multiplexed with an uplink data channel within a slot.

UCI carried by a long duration UL control channel with at least the design having a low peak to average power ratio (PAPR) may be transmitted in one slot or multiple slots.

Transmission using multiple slots is permitted for total duration (e.g., 1 ms) at least some cases.

In the case of an UL control channel of long duration, time division multiplexing (TDM) between an RS and UCI is supported for DFT-S-OFDM.

A long UL part may be used for PUCCH transmission of long duration. That is, a PUCCH of long duration is supported for both a UL-only slot and a slot having a variable number of symbols configured with a minimum of 4 symbols.

The UCI may be repeated within N slots (N>1) with respect to at least 1 or 2-bit UCI, and the N slots may neighbor or may not neighbor in slots in which a PUCCH of long duration is permitted.

Simultaneous transmission of a PUSCH and a PUCCH is supported with respect to at least a long PUCCH. That is, although data is present, uplink control for a PUCCH resource is transmitted. Furthermore, in addition to PUCCH-PUSCH simultaneous transmission, UCI in a PUSCH is supported.

Intra-TTI slot frequency hopping is supported.

A DFT-s-OFDM waveform is supported.

Transmission antenna diversity is supported.

TDM and FDM between a PUCCH of short duration and a PUCCH of long duration is supported for different UEs in at least one slot. In the frequency domain, a PRB (or multiple PRBs) is a minimum resource unit size for an UL control channel. If hopping is used, a frequency resource and hopping may not be spread to a carrier bandwidth. Furthermore, a UE-specific RS is used for NR-PUCCH transmission. A set of PUCCH resources is configured by higher layer signaling, and a PUCCH resource within the configured set is indicated by downlink control information (DCI).

As part of DCI, timing between data reception and hybrid-ARQ acknowledgement transmission should be able to be dynamically (along with at least RRC) indicated. A combination of a semi-static configuration and dynamic signaling (for at least some types of UCI information) is used to determine a PUCCH resource for a 'long and short PUCCH format.' In this case, the PUCCH resource includes a time domain, a frequency domain, and a code domain, if it is applicable. To use UCI on a PUSCH, that is, some of scheduled resources for UCI, is supported in the case of simultaneous transmission of UCI and data.

Furthermore, at least uplink transmission of a single HARQ-ACK bit is supported at least. Furthermore, a mechanism that enables frequency diversity is supported. Furthermore, in the case of ultra-reliable and low-latency communication (URLLC), a time interval between scheduling request (SR) resources configured in a UE may be smaller than one slot.

Beam Management

In NR, beam management is defined as follows.

Beam management: at least the followings are included as a set of TRP(s) which may be used for DL and UL transmission and reception and/or a set of L1/L2 procedures for obtaining and maintaining UE beams:

Beam determination: an operation for a TRP(s) or a UE to select its own transmission/reception beam.

Beam measurement: an operation for a TRP(s) or a UE to measure the characteristics of a received beamforming signal.

Beam report: an operation for a UE to report information of a beamformed signal based on beam measurement.

Beam sweeping: an operation of covering a space region using a beam transmitted and/or received during a time interval using a predetermined method.

Furthermore, a Tx/Rx beam correspondence in a TRP and a UE is defined as follows.

a Tx/Rx beam correspondence in a TRP is maintained when at least one of the followings is satisfied.

A TRP may determine a TRP reception beam for uplink reception based on the downlink measurement of a UE for one or more Tx beams of the TRP.

A TRP may determine a TRP Tx beam for downlink transmission based on the uplink measurement of the TRP for one or more Rx beams of the TRP.

A Tx/Rx beam correspondence in a UE is maintained when at least one of the followings is satisfied.

A UE may determine a UE Tx beam for uplink transmission based on the downlink measurement of the UE for one or more Rx beams of the UE.

A UE may determine a UE reception beam for downlink reception based on the indication of a TRP based on uplink measurement for one or more Tx beams.

Capability indication of information related to a UE beam correspondence is supported as a TRP.

The following DL L1/L2 beam management procedure is supported within one or multiple TRPs.

P-1: it is used to enable UE measurement for a different TRP Tx beam in order to support the selection of a TRP Tx beam/UE Rx beam(s).

In the case of beamforming in a TRP, in general, it includes intra/inter-TRP Tx beam sweep in a different beam set. For beamforming in a UE, this commonly includes UE Rx beam sweep from a set of different beams.

P-2: it is used to change an inter/intra-TRP Tx beam(s) based on the UE measurement for a different TRP Tx beam.

P-3: it is used to change a UE Rx beam based on UE measurement for the same TRP Tx beam if a UE uses beamforming.

Aperiodic reporting triggered by a network at least is supported in the P-1, P-2 and P-3-related operations.

UE measurement based on an RS for beam management (at least CSI-RS) is configured with K beams (total number of beams). A UE reports the measurement result of selected NTx beams. In this case, N is not an essentially fixed number. A procedure based on an RS for mobility purposes is not excluded. Report information includes a measurement quantity for an N beam(s) and information indicating an N DL Tx beam when at least N<K. Particularly, a UE may report a CSI-RS resource indicator (CRI) of N' with respect to K'>1 non-zero-power (NZP) CSI-RS resources.

A UE is configured with the following higher layer parameters for beam management.

N≥1 reporting setting, M≥1 resource configuration

Links between the reporting setting and the resource configuration is configured in an agreed CSI measurement configuration.

CSI-RS-based P-1 and P-2 are supported as resource and reporting setting.

P-3 may be supported regardless of the presence or absence of reporting setting.

Reporting setting including at least the following contents
Information indicating a selected beam
L1 measurement reporting
Time domain operations (e.g., aperiodic operation, periodic operation, semi-persistent operation)
Frequency granularity when several frequency granularities are supported
Resource setting including at least the following contents
Time domain operations (e.g., aperiodic operation, periodic operation, semi-persistent operation)
RS type: at least NZP CSI-RS
At least one CSI-RS resource set. Each CSI-RS resource set includes K≥1 CSI-RS resources (some parameters of KCSI-RS resources may be the same. For example, a port number, a time domain operation, density and period)

Furthermore, NR supports the following beam report by taking into consideration an L group where L>1.

Information indicating a minimum group
A measurement quantity for an N1 beam (L1 RSRP and CSI reporting support (if a CSI-RS is for CSI acquisition))
Information indicating an NIDL Tx beam, if it is applicable A group-based beam report, such as that described above, may be configured in a UE unit. Furthermore, the group-based beam report may be turned off in a UE unit (e.g., when L=1 or NI=1).

NR supports that a UE can trigger a mechanism for recovery from a beam failure.

A beam failure event occurs when the quality of a beam pair link of an associated control channel is sufficiently low (e.g., a comparison with a threshold value, the time out of an associated timer). A mechanism recovery from a beam failure (or obstacle) is triggered when a beam obstacle occurs.

A network performs explicit configuration in a UE having a resource for transmitting an UL signal for recovery purposes. The configuration of resources is supported in the place where a base station performs listening from all or some directions (e.g., random access region).

An UL transmission/resource for reporting a beam obstacle may be located at the same time instance as a PRACH (resource orthogonal to a PRACH resource) or at a time instance (may be configured in a UE) different from that of a PRACH. The transmission of a DL signal is supported so that a UE can monitor a beam in order to identify new potential beams.

NR supports beam management regardless of beam-related indication. If beam-related indication is provided, information on a UE-side beamforming/reception procedure used for CSI-RS-based measurement may be indicated in the UE through QCL.

Parameters for delay, Doppler, and an average gain used in the LTE system and a space parameter for beamforming in a receiver are expected to be added as QCL parameters to be supported in NR. An angle of arrival (AOA)-related parameter in the UE reception beamforming viewpoint and/or angle of departure (AOD)-related parameters in the base station reception beamforming viewpoint may be included as the QCL parameters.

In NR, the angle of arrival-related parameter is collectively called a spatial receive (Rx) parameter. That is, what a specific antenna port has been QCLed with a different antenna port in the spatial Rx parameter viewpoint means that a receiver that receives the corresponding two antenna ports may use the same reception beam (spatial filter). This is the same as that in the downlink viewpoint, a base station notifies a UE that the same or similar transmission beam is applied when the base station transmits the corresponding two antenna ports.

NR supports the use of a control channel and the same or different beams in the corresponding data channel transmission.

For NR-PDCCH transmission supporting robustness for beam pair link blocking, a UE may be configured to monitor an NR-PDCCH on M beam pair links at the same time. In this case, M≥1 and a maximum value of M may depend on at least UE capability.

A UE may be configured to monitor an NR-PDCCH on a different beam pair link(s) in different NR-PDCCH OFDM symbols. A parameter related to a UE Rx beam configuration for monitoring an NR-PDCCH on multiple beam pair links is configured by higher layer signaling or a MAC CE and/or is taken into consideration in the search space design.

At least, NR supports indication of space QCL assumption between a DL an RS antenna port(s) and a DL RS antenna port(s) for the demodulation of a DL control channel. A candidate signaling method for beam indication for an NR-PDCCH (i.e., a configuration method of monitoring an NR-PDCCH) is MAC CE signaling, RRC signaling, DCI signaling, spec transparent and/or implicit method, and a combination of these signaling methods.

For the reception of a unicast DL data channel, NR supports space QCL assumption indication between a DL an RS antenna port and a DMRS antenna port of a DL data channel.

Information indicating an RS antenna port is indicated through DCI (downlink permission). Furthermore, the information indicates an RS antenna port QCLed with a DMRS antenna port. A different set of DMRS antenna ports for a DL data channel may be indicated as QCL with a different set of n RS antenna ports.

UL (PUCCH/PUSCH) beam indication is described in brief. In this case, the UL beam indication is a common term. In NR, in the UL beam indication, a UL beam is indicated by a spatial_relation_info. field configuration.

The spatial_relation_info. field is an SRS resource ID(s) (SRI) if an UL beam pair determination procedure based on an SRS has been performed. If beam compatibility (or beam correspondence) is present between a DL beam and an UL beam, the spatial_relation_info. Field may include a CSI-RS resource ID(s) (CRI) or a synchronization signal block (SSB) ID (or a different ID corresponding to the SSB ID, e.g., a PBCH DMRS ID), that is, a DL RS for indicating a DL beam.

For example, UL beam indication for a PUCCH may be indicated using a method of (1) indicating one SRI, CRI or SSB ID by the spatial_relation_info. field configuration in the RRC layer or (2) configuring a plurality of SRIs, CRIs or SSB IDs in the RRC layer and designating one ID of them in the MAC layer.

In the case of (2), in the RRC layer, the spatial relation info. Field has a plurality of configured characteristics.

Furthermore, the UL beam indication for a PUSCH is also similar to the UL beam indication for a PUCCH, but is different in that the final PUSCH beam indication indicates a corresponding SRS resource ID (SRI) using DCI because SRS transmission will be performed (through a matched UL beam pair) for UL link adaptation even after an UL beam pair determination is terminated.

In this case, the corresponding SRI has a role to indicate one of a plurality of SRS resource IDs previously configured in a higher layer. The SRS resource IDs may be beam-configured as a CRI, an SSB ID, or an SRI and the spatial_relation_info. field (for beam management use), respectively.

Furthermore, in NR, semi-persistent CSI reporting is supported as a PUSCH in addition to a PUCCH.

In this case, in order to perform semi-persistent CSI reporting using a PUSCH, a scheduling grant is indicated through an RNTI different from a C-RNTI which is used to perform common one-shot scheduling similar to the semi-persistent scheduling (SPS) PUSCH resource allocation method.

In this case, the RNTI is configured as an RRC message.

Table 4 shows an example of RRC parameters related to PUCCH beam indication, and Table 5 shows an example of MAC CE parameters related to PUCCH beam indication.

TABLE 4

| Parameter name in specification | Parameter name in text | Description | Value range |
|---|---|---|---|
| PUCCH-SpatialRelationInfo | PUCCH-SpatialRelationInfo | List of configurations of the spatial relation between a reference RS and PUCCH. Reference RS can be SSB/CSI-RS/SRS. If the list has more than one element, MAC-CE selects a single element. | Each element of the list is an SSB Index, NZP-CSI-RS-ResourceConfigId, or SRS-ResourceConfigId |

TABLE 5

| Parameter Name | Description | Size/format |
|---|---|---|
| PUCCH-SpatialRelationInfo | Provides the spatial relation for a PUCCH resource | PUCCH resource ID | Bitmap of size [8] (Bitmap activates one of the [8] entries within the RRC parameter PUCCH-Spatial-relation-info) |

Furthermore, in a PUCCH to which a single beam is applied and a PUCCH to which a plurality of beams is applied, N beams are determined with respect to each of a plurality of PUCCH resources (or symbol groups) repeatedly transmitted N times in one slot.

In this case, each of the N beams may be configured (or indicated or applied) using the same beam or may be configured using different beams.

For example, the spatial_relation_info field is configured/indicated in each of a plurality of PUCCH resources repeatedly transmitted within one slot. In this case, whether the same spatial_relation_info value is applied or whether the spatial_relation_info value is identically or differently set for each PUCCH symbol group of one PUCCH resource transmitted within one slot may be determined.

In the case of a PUSCH, repetitive transmission is performed in a symbol group unit. Whether the same SRI value is applied to a different symbol group may be determined.

Furthermore, in the NR system, a transmission configuration indicator (TCI) field included in DL-related DCI functions to dynamically indicate one of the candidates of multiple QCL reference resources (e.g., CSI-RS resources or SSB resources) configured in a higher layer as in the PQI field of LTE.

In this case, QCL indication may include QCL indication for a spatial parameter. For example, QCL indication may indicate that a corresponding PDSCH is transmitted through which one of a plurality of DL RS resources configured in a higher layer, through a TCI field.

A UE that has received the QCL indication may receive a corresponding PDSCH beam by applying an Rx beam previously trained to be suitable for the reception of a corresponding DL RS.

Hybrid Beamforming

The existing beamforming technology using multiple antennas may be divided into an analog beamforming scheme and a digital beamforming scheme depending on the location to which a beamforming weight vector/precoding vector is applied.

The analog beamforming scheme is a beamforming scheme initially applied to a multiple antenna structure. This may mean a scheme for branching an analog signal on which digital signal processing has been completed into multiple paths and forming a beam by applying a phase shift (PS) and power amplifier (PA) configuration to each path.

For analog beamforming, there is a need for a structure in which a PA and PS connected to each antenna process an analog signal derived from a single digital signal. In other words, in t he analog stage, the PA and the PS process a complex weight.

FIG. 5 shows an example of a block diagram of a transmitter configured with an analog beamformer and an RF chain. FIG. 5 is merely for convenience of description, and does not limit the scope of the present invention.

In FIG. 5, the RF chain means a processing block in which a baseband (BB) signal is converted into an analog signal. In the analog beamforming scheme, accuracy of a beam is determined based on the characteristics of the elements of the PA and the PS. The scheme may be advantageous in narrowband transmission in terms of control of the elements.

Furthermore, in the case of the analog beamforming scheme, a multiplexing gain for increasing a transfer rate is relatively small because the scheme is configured with hardware structure that is difficult to implement multiple stream transmission. Furthermore, in this case, beamforming for each UE based on orthogonal resource allocation may not be easy.

In contrast, in the case of the digital beamforming scheme, beamforming is performed in the digital stage using a baseband (BB) process in order to maximize diversity and a multiplexing gain in the MIMO environment.

FIG. 6 shows an example of a block diagram of a transmitter configured with a digital beamformer and RF chains. FIG. 6 is merely for convenience of description, and does not limit the scope of the present invention.

In FIG. 6, beamforming may be performed as precoding is performed in a BB process. In this case, an RF chain includes a PA. The reason for this is that in the case of the digital beamforming scheme, a complex weight derived for beamforming is directly applied to transmission data.

Furthermore, multiple user beamforming can be supported at the same time because different beamforming can be performed for each UE. Furthermore, the flexibility of scheduling is improved because independent beamforming is possible for each UE to which an orthogonal resource has been applied, and thus the transmitter can operate in accordance with system purposes. Furthermore, in the environment supporting wideband transmission, an independent beam may be formed for each subcarrier if a technology, such as MIMO-OFDM, is applied.

Accordingly, the digital beamforming scheme can maximize a maximum transfer rate of a single UE (or user) based on a capacity increase of a system and an enhanced beam gain. An MIMO scheme based on digital beamforming has been introduced in the existing 3G/4G (e.g., LTE(-A)) system based on characteristics, such as those described above.

In the NR system, a massive MIMO environment in which Tx and Rx antennas are significantly increased may be taken into consideration. In general, in cellular communication, a maximum number of Tx and Rx antennas applied to the MIMO environment is assumed to be 8. However, as the massive MIMO environment is taken into consideration, the number of Tx and Rx antennas may increase to tens or several hundreds.

In this case, in the massive MIMO environment, if the above-described digital beamforming technology is applied, the transmitter has to perform signal processing on several hundreds of antennas through a BB process for digital signal processing. Accordingly, the complexity of hardware implementation may significantly increase because the complexity of signal processing significantly increases and an RF chain is necessary as many as the number of antennas.

Furthermore, the transmitter needs to perform independent channel estimation on all antennas. Furthermore, in the case of the FDD system, a pilot and/or feedback overhead may significantly increase because the transmitter requires feedback information on a massive MIMO channel configured with all antennas.

In contrast, in the massive MIMO environment, if the above-described analog beamforming technology is applied, hardware complexity of the transmitter is relatively low.

In contrast, an increase of performance using a plurality of antennas is very small, and the flexibility of resource allocation may be reduced. Particularly, upon wideband transmission, it is not easy to control a beam for each frequency.

Accordingly, the massive MIMO environment requires a transmitter configuration method of a hybrid form in which analog beamforming and digital beamforming structures have been combined without exclusively selecting only one of the analog beamforming and digital beamforming schemes.

Analog Beam Scanning

In general, analog beamforming may be used in a pure analog beamforming transmission and reception stage and hybrid beamforming transmission and reception stage. In this case, analog beam scanning may perform estimation on one beam at the same time. Accordingly, a beam training time necessary for beam scanning is proportional to a total number of candidate beams.

As described above, in the case of analog beamforming, a beam scanning process in the time domain is essentially necessary for transmission and reception stage beam estimation. In this case, an estimation time $t_s$ for all transmission and reception beams may be represented like Equation 2.

$$T_S = t_s \times (K_T \times K_R)$$

[Equation 2]

In Equation 2, ts means the time necessary for one beam scanning, $K_T$ means the number of transmission beams, and $K_R$ means the number of reception beams.

FIG. 7 shows an example of an analog beam scanning method. FIG. 7 is merely for convenience of description, and does not limit the scope of the present invention.

In FIG. 7, it is assumed that a total number of transmission beams $K_T$ is L and a total number of reception beams $K_R$ is 1. In this case, L resource regions are necessary in the time domain because a total number of candidate beams is L.

In other words, since only one-beam estimation can be performed in a single resource region for analog beam estimation, as shown in FIG. 7, the L resource regions are necessary to perform all L beams (P1 to PL) estimation. After an analog beam estimation procedure is terminated, a UE feeds the identity (e.g., ID) of a beam, having the highest signal intensity, back to a base station. That is, a longer training time may be necessary as the number of individual beams increases in accordance with an increase of the number of transmission and reception antennas.

In analog beamforming, unlike in digital beamforming, it is necessary to guarantee a training interval for each beam because the size of a contiguous waveform and a phase angle in the time domain are changed after a digital-to-analog converter (DAC). Accordingly, as the length of the training interval increases, efficiency of a system may be reduced (i.e., a loss of a system is increased).

Channel State Information (CSI) Feedback

In most of cellular systems including the LTE system, a UE receives a pilot signal (reference signal) for channel estimation from a base station, calculates channel state information (CSI), and reports it to a base station.

The base station transmits a data signal based on CSI information fed back by the UE.

In the LTE system, the CSI information fed back by the UE includes channel quality information (CQI), a precoding matrix index (MPI), and a rank indicator (RI).

CQI feedback is radio channel quality information provided to a base station for the purpose (link adaptation use) of providing a guide regarding which modulation & coding scheme (MCS) will be applied when the base station transmits data.

If radio quality between a base station and a UE is high, the UE feeds a high CQI value back, and the base station may transmit data by applying a relatively high modulation order and low channel coding rate. In the case of the opposite, the UE feeds a low CQI value back, and the base station may transmit data by applying a relatively low modulation order and high channel coding rate.

PMI feedback is preferred precoding matrix information provided to a base station for the purpose of providing a guide regarding which MIMO precoding scheme will be applied if the base station installs multiple antenna.

A UE estimates a downlink MIMO channel between a base station and the UE based on a pilot signal, and recommends that it is better for the base station to apply which MIMO precoding through PMI feedback.

In the LTE system, only linear MIMO precoding that may be represented in a matrix form is taken into consideration in a PMI configuration.

A base station and a UE share a codebook configured with multiple precoding matrices. Each MIMO precoding matrix within the codebook has a unique index.

Accordingly, the UE feeds an index, corresponding to the most preferred MIMO precoding matrix within the codebook, back as a PMI, thereby minimizing the amount of feedback information of the UE.

A PMI value does not need to be essentially configured with one index. For example, in the LTE system, if the number of Tx antenna ports is 8, it has been configured that the final 8 Tx MIMO precoding matrices can be derived only when two indices (first PMI & second PMI) are combined.

RI feedback is information for the number of preferred transport layers provided to a base station for the purpose of providing a guide for the number of transport layers preferred by a UE, if the base station and the UE install multiple antennas and multi-layer transmission through spatial multiplexing is possible.

An RI has a very close relation with a PMI. The reason for this is that a base station needs to be aware that it has to apply which precoding to each layer based on the number of transport layers.

In the PMI/RI feedback configuration, a PMI codebook may be configured based on single layer transmission and a PMI may be defined for each layer and fed back. However, such a method has a disadvantage in that the amount of PMI/RI feedback information significantly increases in accordance with an increase of the number of transport layers.

Accordingly, in the LTE system, a PMI codebook according to the number of transport layers has been defined. That is, N matrices of a size NtxR is defined within the codebook for R-layer transmission (In this case, R is the number of layers, Nt is the number of transmission antenna ports, and N is the size of the codebook).

Accordingly, in LTE, the size of a PMI codebook is defined regardless of the number of transport layers. As a result, if a PMI/RI is defined using such a structure, the number of transport layers (R) is identical with a rank value of a precoding matrix (NtxR matrix), so the term "rank indicator (RI)" is used.

The PMI/RI described in this specification is not restricted to that it essentially means an index value of a precoding matrix and a rank value of a precoding matrix represented as an NtxR matrix as in PMI/RI of the LTE system.

The PMI described in this specification indicates preferred MIMO precoder information, among MIMO precoders applicable in the transmission stage. The form of the precoder is not limited to only a linear precoder that may be represented as a matrix as in the LTE system. Furthermore, the RI described in this specification has a wider meaning than an RI in LTE, and includes all feedback information indicating the number of preferred transport layers.

CSI information may be obtained in the entire system frequency domain and may be obtained in some frequency domain. Particularly, in a wideband system, it may be useful to obtain CSI information for some preferred frequency domain (e.g., subband) for each UE and to feed it back.

In the LTE system, CSI feedback is performed through an uplink channel. In general, periodic CSI feedback is performed through a physical uplink control channel (PUCCH), and aperiodic CSI feedback is performed through a physical uplink shared channel (PUSCH) that is an uplink data channel.

Aperiodic CSI feedback means that a base station temporarily performs feedback only when it wants CSI feedback information. A base station triggers CSI feedback through a downlink control channel, such as a PDCCH/ePDCCH.

In the LTE system, when CSI feedback is triggered, what a UE should feed which information back has been classified as a PUSCH CSI reporting mode as in FIG. 8. A UE is previously notified of what the UE should operate in which PUSCH CSI reporting mode through a higher layer message.

FIG. 8 is a diagram showing an example of a PUSCH CSI reporting mode.

A PUCCH CSI reporting mode is also defined for periodic CSI feedback through a PUCCH.

FIG. 9 is a diagram showing an example of a PUCCH CSI reporting mode.

In the case of a PUCCH, it is difficult to transmit CSI information to be transmitted at once because the amount of data (payload size) that may be transmitted at once is small compared to a PUSCH.

Accordingly, timing in which a CQI and a PMI are transmitted and timing in which an RI is transmitted are different depending on each CSI reporting mode. For example, in the reporting modes 1-0, only the RI is transmitted in specific PUCCH transmission timing, and a wideband CQI is transmitted in different PUCCH transmission timing. A PUCCH reporting type is defined depending on the type of CSI information configured in specific PUCCH transmission timing. For example, in the example, a reporting type in which only the RI is transmitted corresponds to type3, and a reporting type in which only the wideband CQI is transmitted corresponds to type4. An RI feedback period, an offset value, a CQI/PMI feedback period, and an offset value are configured in a UE through a higher layer message.

The CSI feedback information is included in uplink control information (UCI).

Reference Signals in LTE

In the LTE system, the usage of a pilot or a reference signal (RS) may be divided as follows.

1. Measurement RS: Pilot for Channel State Measurement

A. CSI measurement/reporting usage (short term measurement): purposes for link adaptation, rank adaptation, closed loop MIMO precoding, etc.

B. Long term measurement/reporting usage: purposes for handover, cell selection/reselection, etc.

2. Demodulation RS: Pilot for Physical Channel Reception

3. Positioning RS: Pilot for UE Location Estimation

4. MBSFN RS: Pilot for Multi-Cast/Broadcast Service

In LTE Rel-8, a cell-specific RS (CRS) was used for (FIG. 1A/B for) measurement and (FIG. 2 for) demodulation for most of downlink physical channels. In order to solve an RS overhead problem according to an increase of the number of antennas, a CSI-RS dedicated for CSI measurement (usage 1A) is used from LTE Advanced (Rel-10), and a UE-specific RS dedicated for reception (usage 2) for a downlink data channel (PDSCH) is used.

A CSI-RS is an RS dedicatedly designed for CSI measurement and feedback and is characterized in that it has very lower RS overhead than a CRS. The CRS supports up to 4 multiple antenna ports, whereas the CSI-RS has been designed to support up to 8 multiple antenna ports. The UE-specific RS is designed to be dedicated to the demodulation of a data channel, and is characterized in that unlike in the CRS, a MIMO precoding scheme applied to a corresponding UE upon data transmission is an RS (precoded RS) identically applied to a pilot signal.

Accordingly, the UE-specific RS does not need to be transmitted as many as the number of antenna port like the CRS, CSI-RS, and has only to be transmitted as many as the number of transport layers (transmission ranks).

Furthermore, the UE-specific RS is characterized in that it is a UE-specific RS because it is transmitted for the data channel reception usage of a corresponding UE in the same resource region as a data channel resource region allocated to each UE through the scheduler of a base station.

A CRS is cell-specific because it is always transmitted as the same pattern within a system bandwidth so that all UEs within a cell can use the CRS for measurement and demodulation usage.

In LTE uplink, a sounding RS (SRS) has been designed as a measurement RS. A demodulation RS (DMRS) for an uplink data channel (PUSCH) and a DMRS for an uplink control channel (PUCCH) for ACK/NACK and CSI feedback have been designed.

Beam Management and Beam Recovery

A base station may request, from a UE, periodic CSI reporting, semi-persistent CSI reporting (periodic CSI reporting is activated for only a specific resource region or a plurality of times of CSI reportings is performed contiguously), or aperiodic CSI reporting.

In this case, in the periodic and semi-persistent (SP) CSI reporting, an uplink (UL) resource (e.g., PUCCH in LTE) for CSI reporting is allocated to a UE in a specific period during the interval in which reporting has been activated.

For the CSI measurement of a UE, a base station needs to transmit a downlink (DL) reference signal (RS).

In the case of a beamformed system to which (analog) beamforming has been applied, it is necessary to determine a DL transmission (Tx)/reception (Rx) beam pair for DL RS transmission/reception and an UL Tx/Rx beam pair for uplink control information (UCI, e.g. CSI, ACK/NACK) transmission/reception.

A procedure of determining a DL beam pair may include a combination of (1) a procedure of transmitting, by a base station, DL RSs corresponding to a plurality of TRP Tx beams to a UE, (2) a TRP Tx beam selection procedure of selecting and/or reporting, by the UE, one of the DL RSs, (3) a procedure of repeatedly transmitting, by the base station, the same RS signal corresponding to each TRP Tx beam, and (4) a procedure of measuring, by the UE, the repeatedly transmitted signals using different UE Rx beams and selecting a UE Rx beam.

Furthermore, an UL beam pair determination procedure may include a combination of (1) a procedure of transmitting, by a UE, UL RSs corresponding to a plurality of UE Tx beams to a base station, (2) a UE Tx beam selection procedure of selecting and/or signaling, by the base station, one of the UL RSs, (3) a procedure of repeatedly transmitting, by the UE, the same RS signal corresponding to each UE Tx beam to the base station, and (4) a procedure of measuring, by the base station, the repeatedly transmitted signals using different TRP Rx beams and selecting a TRP Rx beam.

If the beam reciprocity (or beam correspondence) of DL/UL is established, that is, if a base station DL Tx beam and a base station UL Rx beam may be assumed to be the same and a UE UL Tx beam and a UE DL Rx beam may be assumed to be the same in communication between a base station and a UE, a procedure of determining the other of a DL beam pair and an UL beam pair may be omitted if one of the DL beam pair and the UL beam pair is determined.

A determination process for a DL and/or UL beam pair may be performed periodic or aperiodically.

If the number of candidate beams is many, the frequent occurrence of a determination process for a DL and/or UL beam pair is not preferred because required RS overhead may be great.

It is assumed that after a DL/UL beam pair determination process is completed, a UE performs periodic or semi-persistent (SP) CSI reporting.

In this case, a CSI-RS including a single or a plurality of antenna ports for the CSI measurement of the UE may be beamformed and transmitted using a TRP Tx beam determined as a DL beam, and the transmission period of the CSI-RS may be the same as a CSI reporting period or may be performed more frequently.

Alternatively, a UE may transmit an aperiodic CSI-RS based on a CSI reporting period or more frequently.

A terminal (e.g., UE) may periodically transmit measured CSI information using a predetermined UL Tx beam in an UL beam pair determination process.

In performing a DL/UL beam management process, a beam mismatch problem may occur depending on the period of configured beam management.

Particularly, when a UE moves its location, a UE rotates, or a radio channel environment is changed due to a movement of an object around a UE (e.g., when a line-of-sight (LoS) environment is changed into a non-LoS environment because a beam is blocked), an optimal DL/UL beam pair may be changed.

In general, such a change is a beam management process performed by network indication, and may mean that a beam failure event has occurred when tracking fails.

A UE may determine whether such a beam failure event has occurred through reception quality of a downlink RS. A report message for such a condition or a message for a beam recovery request (hereinafter defined as a "beam recovery request message") needs to be transmitted by the UE.

The beam recovery request message may be represented in various ways, like a beam failure recovery request message, a control signal, a control message, a first message, etc.

A base station that has received the beam recovery request message from the UE may perform beam recovery through various processes, such as beam RS transmission and a beam reporting request, with respect to the UE for the beam recovery.

Such a series of beam recovery process is represented as "beam recovery."

In 3GPP, the standardization of a new communication system named a new radio or New Rat (NR) after LTE is in progress, and includes the following contents in relation to beam management.

(Contents 1)

NR supports that a UE can trigger a mechanism for recovery from a beam failure.

A network explicitly configures in a UE a resource for the UL transmission of signals for recovery purposes.

It supports the configuration of resources heard by a base station in all or some directions (e.g., a random access region).

(to be discussed later) the trigger condition of a recovery signal (new or existing signal) related to the UE operation of RS/control channel/data channel monitoring It supports the transmission of a DL signal that permits a UE to monitor a beam in order to identify new potential beams.

(to be discussed later) the transmission of a beam sweep control channel is not excluded.

This mechanism needs to take into consideration the tradeoff between performance and DL signaling overhead.

(Contents 2)

Beam management overhead and a latency time need to be taken into consideration in the CSI-RS design for NR beam management by taking into consideration the following possible candidate solution.

Opt1. IFDMA

Opt2. Large Subcarrier Spacing

Other aspects that are taken into consideration in the CSI-RS design for NR beam management include CSI-RS multiplexing, UE beam switch latency, a UE implementation difficulty (e.g., AGC training time), and coverage of a CSI-RS, for example.

(Contents 3)

A CSI-RS supports DL Tx beam sweeping and UE Rx beam sweeping.

An NR CSI-RS supports the following mapping structure.

An NP CSI-RS port may be mapped for each (sub) time unit.

The same CSI-RS antenna ports may be mapped in a (sub) time unit.

In this case, the "time unit" indicates n>=1 OFDM symbol in a configured/reference numerology.

Each time unit may be partitioned in a sub-a time unit.

This mapping structure may be used to support a multiple panels/Tx chain.

(Option 1)

A Tx beam(s) is the same in a sub time unit within each time unit.

A Tx beam(s) is different in a time unit.

(Option 2)

A Tx beam(s) is different for each sub time unit within each time unit.

A Tx beam(s) is the same in time units.

(Option 3): Combination of Option 1 and Option 2

A Tx beam(s) is the same in a sub time unit within one time unit.

A Tx beam(s) is different for each sub time unit within a different time unit.

Beam Failure Recovery Mechanism

Hereinafter, a beam failure recovery mechanism of a UE related to methods proposed in this specification is described in brief.

A beam failure recovery mechanism of a UE includes the following processes (1) to (4).

(1) Senses a beam failure.

(2) Identify a new candidate beam.

(3) Transmit a beam failure recovery request.

(4) A UE monitors a response from a gNB for the beam failure recovery request.

First, a beam failure sensing process is described. A UE monitors a beam failure sensing RS in order to evaluate whether a beam failure trigger condition has been satisfied.

Furthermore, the beam failure sensing RS includes a periodic CSI-RS for at least beam management. In this case, a synchronization signal (SS) block may also be used for beam management. If the SS block is used for beam management, an SS block within a serving cell may be taken into consideration.

In this case, the SS block may be construed that a synchronization signal (SS) is transmitted in a slot unit or a specific resource unit.

In this case, the beam failure sensing RS includes a case where quality of the corresponding RS is measured and a case where detection/demodulation quality of a radio channel associated with the corresponding RS through a quasi co-location (QCL) indicator is measured. For example, a CSI-RS or SS block-related ID indicated for (primary) PDCCH monitoring may be understood as a beam failure sensing RS. In this case, whether a beam failure event occurs may be defined as a case where detection/demodulation performance of the corresponding PDCCH is a given level or less.

The beam failure event may occur when quality of a beam pair link(s) of an associated control channel drops to a given level or less.

Specifically, quality of the beam pair link(s) of the associated control channel may be determined based on PDCCH detection performance.

For example, if PDCCH detection performance is not good as a result of CRC check in a process for a UE to monitor (or blind decode) a PDCCH, the UE may detect a beam failure.

Alternatively, if multiple PDCCHs are transmitted through multiple beams (or multiple PDCCHs are transmitted through different beams), whether a beam failure event occurs may be determined based on detection performance of a specific PDCCH (e.g., PDCCH associated with a serving beam).

In this case, each of the multiple PDCCHs may be transmitted and/or received for each different beam in a different control channel region (e.g., symbol, slot, subframe).

In this case, a control channel region for each beam may be previously defined or may be transmitted and received through higher layer signaling.

Furthermore, if whether a beam failure event has occurred is determined based on quality of the beam pair link(s) of the associated control channel, whether the beam failure event has occurred may be determined based on whether only quality of a DL beam has dropped to a given level or less, or whether only quality of an UL beam has dropped to a given level or less, or whether both quality of a DL beam and quality of an UL beam have dropped to a given level or less.

In this case, the given level or less may be a threshold value or less, the time-out of an associated timer, etc.

Furthermore, a BRS, an RS for fine timing/frequency tracking, SS Blocks, a DM-RS for a PDCCH, a DM-RS for a PDSCH may be used as a signal to detect the beam failure.

Next, a process of identifying a new candidate beam is described. A UE searches for a new candidate beam by monitoring a beam identification RS.

The beam identification RS includes information for a periodic CSI-RS and SS block within a serving cell 1) if the RS is configured by NW, a periodic CSI-RS for beam management, 2) if an SS block is used for beam management.

Next, a beam failure recovery request transmission process is described. Information carried by a beam failure recovery request includes at least one of 1) explicit/implicit information for identifying a UE and new gNB TX beam or 2) explicit/implicit information for identifying a UE and determining whether a new candidate beam is present.

Furthermore, the transmission of the beam failure recovery request may select one of PRACH, PUCCH, PRACH-like (e.g., a different parameter for a preamble sequence from a PRACH).

A beam failure recovery request resource/signal may be additionally used for a scheduling request.

Next, a E monitors a control channel search space in order to receive a gNB response for a beam failure recovery request.

Furthermore, the following triggering condition is supported for beam failure recovery request transmission.

Condition: a case where a beam failure is detected and a candidate beam is identified if only a CSI-RS is used to identify a new candidate beam Furthermore, the following channel is supported for beam failure recovery request transmission.

use a non-contention-based channel based on a PRACH, a resource orthogonal to the resource of at least different PRACH transmission for FDM.

supports a PUCCH for beam failure recovery request transmission.

As described above, in the case of NR, in a beam recovery request message, both mechanisms that (1) the message is transmitted using the same symbols as those of a PRACH (first) and (2) that the message is transmitted using symbols other than those of a PRACH (second).

The first may be a useful mechanism if up to uplink sync has been lost due to a beam failure (when beam quality drops relatively much or when there is no alternative beam) and/or if beam failure event occurrence timing and a pre-configured PRACH resource are close in terms of time.

The second may be a useful mechanism if a beam failure condition or uplink sync has not been lost (when beam quality drops relatively slight or when an alternative beam is present) and/or when it is difficult for fast beam recovery to wait up to a PRACH resource (e.g., symbol) because beam failure event occurrence timing and a pre-configured PRACH resource are distant in terms of time.

Furthermore, upon beam failure, a UE transmits a beam recovery request message to a base station given numbers of times, and may perform a radio link failure (RLF) operation if a response to the request is not received from the base station.

Hereinafter, a PUCCH design (or configuration) method using a multi-beam, which is proposed in this specification, is described.

In this case, the PUCCH design may include the concepts of a PUCCH format definition related to PUCCH transmission, sequence generation, mapping to physical resources, etc.

Furthermore, hereinafter, a method of designing a PUCCH using a multi-beam is described specifically, but contents proposed in this specification are not limited thereto and may be identically applied to a method of transmitting a PUCCH using one beam.

Prior to the description of the multi-beam-based PUCCH configuration method proposed in this specification, a phenomenon in which communication quality is degraded because a beam mismatch (misalign), etc. occurs due to a movement of a UE in a beamforming system is described in brief.

That is, when a UE moves its location or rotates or when a radio channel environment for a UE is changed due to a movement of a surrounding object (e.g., when a line-of-sight (LoS) environment changes into a non-LoS environment because a beam is blocked), an optimal DL/UL beam pair between the UE and a base station may be changed.

In this case, if the UE performs a procedure of correcting a DL/UL beam every CSI reporting instance along with the base station, there is a problem in that overhead for a reference signal (RS) and signaling is too great.

Particularly, when it is taken into consideration that periodic or semi-persistent (SP) CSI reporting may be activated for link maintenance and rapid scheduling when traffic occurs although there is no data traffic to be transmitted to a UE, it is not preferred to perform a frequent determination process on a beam pair in the power consumption viewpoint of the UE and a base station.

As a result, CSI reporting may be performed more frequently than frequency of the beam pair determination process. In this case, communication quality is degraded because beams are gradually misaligned.

A method, such as that described above, may be applied to solve that communication quality is degraded as described above.

When a UE reports channel state information (CSI) periodically or semi-persistently to a base station, if a link quality level measured by the UE from a DL reference signal (RS) drops (to a given level or less), the number of UL Tx beams of the UE used in an UL physical channel (e.g., PUCCH) for CSI reporting may be increased.

In this case, the link quality measured by the UE from the DL RS may be (1) CQI information measured for CSI reporting usage, (2) a CQI measured in the state in which a DL transmission RI has been assumed to be 1 regardless of an RI value measured for CSI reporting, (3) a reception power value (e.g., RSRP in LTE) for the DL RS, (4) a reception quality value (e.g., RSRQ in LTE) for the DL RS.

For example, a UE may apply a single beam to PUCCH transmission when link quality measured by the UE from a DL RS is a given level or more, and may apply a plurality of beams to the PUCCH transmission when the corresponding link quality is a given level or less.

For another example, thresholds for link quality may be multiplexed, and the number of beams for PUCCH transmission may be gradually increased whenever a link quality interval drops.

Next, a PUCCH configuration method for PUCCH transmission based on a multi-beam, which is proposed in this specification, is described specifically.

When the PUCCH transmission method based on multi-beam (or a plurality of-beam) proposed in this specification is applied, a terminal (e.g., UE) may take into consideration the following three conditions (Case 1 to Case 3) in selecting a transmission beam (Tx beam).

(Case 1): a case where a UE randomly selects a beam set.

In this case, a base station is unaware of the beam set selected by the UE.

(Case 2): a case where a beam set to be applied to some of PUCCH resources is previously agreed with a base station and a UE, and the remaining beam sets are randomly selected.

(Case 3): a case where a beam set to be applied to a multi-beam-based PUCCH transmission method is previously defined or designated by a base station.

In this case, Case 2 and Case 3 may be more useful than Case 1 when a temporal change in a radio channel is less sudden.

Various embodiments related to the three cases are described.

First Embodiment

The first embodiment relates to PUCCH resource mapping in a single or multi-beam-based PUCCH transmission method.

Specifically, a PUCCH resource and a PUCCH DMRS resource are mapped by a plurality of symbols. A PUCCH demodulation reference signal (DMRS) is mapped to one resource at least "every same beam maintenance time unit" in a time domain.

The same beam maintenance time unit may mean the number of (OFDM) symbols (the number of N OFDM symbols, N is a natural number) for maintaining the same beam when a UE transmits a PUCCH.

The same beam maintenance time unit may be represented like a specific resource unit or a sub-resource.

Furthermore, the same beam maintenance time unit may be interpreted as a meaning indicating the number of symbols in which the same beam is maintained and a resource unit (or resource region or resource interval) in which the same beam is maintained.

Furthermore, the resource unit in which the same beam is maintained may include the concepts of a time and/or frequency resource unit in which the same beam is maintained. The reason for this is that a multi-RF chain UE can change a beam even in the frequency domain. That is, the same beam maintenance time unit may be interpreted as a minimum time and/or frequency resource unit capable of one beam indication (or application).

"A and/or B" represented in this specification may be interpreted as being identical with "at least one of A or B."

Hereinafter, the same beam maintenance time unit is illustrated as indicating the number of symbols in which the same beam is maintained, that is, a time interval, for convenience of description, but may mean a time and/or frequency resource unit in which the same beam is maintained as described above.

Furthermore, the relation between a resource and a sub-resource used in this specification may be represented as a resource group and a resource.

For example, when the same beam maintenance time unit is "1" (N=1), a PUCCH DMRS may be transmitted in all symbols as in FIG. 10.

FIG. 10 is a diagram showing an example of the resource mapping of a multi-beam-based PUCCH DMRS proposed in this specification.

Referring to FIG. 10, PUCCH beams applied to respective symbols are the same, and a PUCCH beam applied between symbols may be different.

Accordingly, in order to perform PUCCH DMRS resource index-based UL beam selection (or correction) in a fifth embodiment, a different PUCCH DMRS resource index may be assigned to each symbol.

That is, as shown in FIG. 10, DMRS resource indices (1 to 6) 1010 may be assigned to 6 symbols, respectively.

Furthermore, in FIG. 10, 2 PUCCH DMRSs have been allocated to one physical resource block (PRB) in the frequency domain, but this is an example. One or up to a maximum of three PUCCH DMRSs may be allocated to one PRB.

FIG. 11 is a diagram showing another example of the resource mapping of a multi-beam-based PUCCH DMRS proposed in this specification.

That is, FIG. 11 is an embodiment when N=2. In FIG. 11a, a PUCCH DMRS is transmitted in all symbols. In FIG. 12b, only one PUCCH DMRS is transmitted every two symbols.

In FIGS. 11a and 11b, every two neighboring symbols may be grouped and applied to the same UL Tx beam. The UL Tx beam may be the same as a beam applied to a DMRS that belongs to a corresponding symbol group.

Accordingly, in this case, one DMRS resource index may be assigned every two symbols.

Furthermore, it may be preferred that the PUCCH DMRS resource mapping of FIG. 11b is applied to a case where a PUCCH format shorter than that of FIG. 11a is used.

Furthermore, in FIG. 11b, symbols to which DMRS resource indices 1 and 2 are assigned, respectively, may be considered to be applied to the former symbol 1110, 1120 of the two symbols. A symbol to which a DMRS resource index 3 is assigned may be considered to be applied to the latter symbol 1130 of the two symbols.

The reason for this is that when a Doppler effect, etc. is taken into consideration, to not use the same DMRS resource may be more efficient.

Furthermore, a DMRS resource used in this specification may be represented as a DMRS antenna port, a DMRS format, etc.

An advantage of the first embodiment is that a PUCCH DMRS transmission beam and a PUCCH transmission beam are identical in each time unit.

Accordingly, a UE may randomly select a beam direction or beam shape and transmit a PUCCH. Although a base station is unaware of information on a PUCCH DMRS transmission beam, it can demodulate a PUCCH transmitted by a corresponding UE.

Another advantage of the first embodiment is that the same UE Tx beam may be applied without any problem although it belongs to a different DMRS resource index.

For example, a PUCCH and PUCCH DMRS design may be performed based on N=1, a PUCCH DMRS resource index is assigned every symbol, but a UE may apply the same beam to all PUCCH symbols or may apply a different beam every neighbor M symbols.

In this case, M is assumed to have a value greater than N.

Next, a channel coding method of uplink control information (UCI) for Case 1 to Case 3 is described.

First, in Case 1 to Case 3, from the viewpoint of a base station that receives a PUCCH from a UE, reception quality of a PUCCH is different every beam maintenance time unit.

Particularly, in the case of Case 1, it may be difficult for a base station to perform demodulation on a PUCCH because reception sensitivity in some time units of the PUCCH is very low.

Accordingly, in order to solve such a problem, a method of equally mapping feedback information (e.g., PUCCH) of a UE to all time units is described (corresponding to Method 1 and a Method 2-1-1 below).

A method of equally mapping feedback information to all time units may be applied to Case 2 or Case 3. If it is assumed that reception quality is guaranteed for a time unit(s) to which a specific agreed beam(s) is applied to some extent, a method (Method 2-2) of mapping relatively important information (e.g., systematic bits) to the corresponding time unit(s) may be taken into consideration.

Alternatively, if the stability of reception quality in some time unit(s) to which a beam(s) randomly selected by a UE is applied is uncertain as in Case 2 or a beam set is sorted as reception quality in Case 3, interleaving may be performed on only some time unit(s) expected to have relatively low reception quality (Method 2-1-2).

Second Embodiment

The second embodiment relates to contents related to channel coding and resource mapping for UCI (e.g., CSI) upon multi-beam-based PUCCH transmission.

In multi-beam-based PUCCH transmission, the following method may be applied to channel coding and resource mapping for UCI.

(Method 1)

Method 1 is a method of coding UCI at a high coding rate, mapping it to the first N symbol(s) of a PUCCH, and consecutively mapping it to PUCCH symbols by repeating the N symbol(s).

In this case, N may be the same value as the same beam maintenance time unit or may have a value corresponding to a positive number times the same beam maintenance time unit.

That is, a PUCCH resource in which UCI is transmitted is configured with a plurality of PUCCH sub-resources, and the UCI may be repeatedly transmitted every sub-resource according to a predetermined encoding method (e.g., encoding at the high coding rate of Method 1).

In this case, the PUCCH resource may be represented as a PUCCH resource group. In this case, the PUCCH sub-resource may be represented as a PUCCH resource.

For example, if a PUCCH resource is 4 symbols, a PUCCH may be twice repeated and transmitted every 2 symbols when a PUCCH sub-resource is 2 symbols.

Furthermore, a DMRS is transmitted in the same RE location every PUCCH sub-resource.

Furthermore, in the case of PUCCH transmission based on a plurality of beams, PUCCH-spatial_relation_info corresponding to beam indication information for a PUCCH may be configured in a PUCCH resource in common or separately configured for each PUCCH sub-resource.

In the case of single beam-based PUCCH transmission, the same spatial_reference_info is applied to all sub-resources.

Alternatively, if only indication for sweeping not a method of separately indicating PUCCH-spatial_relation_info for each PUCCH sub-resource is provided, a UE may freely select a beam for each PUCCH sub-resource and transmit it.

Alternatively, only one PUCCH-spatial relation info is configured. If a sweeping flag is used and the flag is 'ON', a beam indicated as PUCCH-spatial_relation_info may be applied to only one sub-resource, and different beams may be applied to the remaining.

(Method 2)

Method 2 is a method of coding UCI at a low coding rate and mapping it to all PUCCH resources (or all PUCCH symbols).

Specifically, in Method 2, time-domain perform interleaving is performed in a process of channel-coding UCI or a process of mapping to a PUCCH resource.

In this case, the time-domain interleaving may include (i) performing interleaving on all symbols or (ii) performing interleaving on only some symbol sets.

Alternatively, in Method 2, frequency first mapping may be performed on important information (e.g., systematic bit) of coded bits from an agreed symbol location.

In this case, if a PUCCH is designed or configured regardless of the number of beams of a PUCCH or whether sweeping has been performed on the PUCCH, it may be more preferred to apply the first embodiment and the second embodiment.

A method of designing or configuring a PUCCH depending on the number of beams of a PUCCH or sweeping is described through a third embodiment.

Third Embodiment

The third embodiment relates to a method of differently designing or configuring a PUCCH in at least one of the following aspects depending on the number of beams used for PUCCH transmission or whether sweeping has been performed.

The first is a method of differently configuring a PUCCH in at least one aspect of the time resource, frequency resource or code resource of the PUCCH.

For example, as the number of beams of a PUCCH increases, at least one of the time resource of the PUCCH or the frequency resource of the PUCCH may be increased.

Alternatively, when sweeping of a PUCCH is "On", the PUCCH may be configured so that the number of PUCCH symbols is greater.

For another example, when the number of beams of a PUCCH increases, the time resource of the PUCCH is increased, but the frequency resource of the PUCCH may be decreased.

The second is to increase the DMRS pattern of a PUCCH.

For example, as the number of beams of a PUCCH increases, the location and/or density of the time domain, the frequency domain of a PUCCH DMRS may be different.

"A and/or B" used in this specification may be interpreted as the same meaning as "include at least one of A or B."

FIG. 12 is a diagram showing an example of the DMRS pattern of PUCCHs proposed in this specification.

FIG. 12a shows an example of a PUCCH DMRS pattern in the case of PUCCH sweeping, and FIG. 12b shows an example of a PUCCH DMRS pattern in the case of PUCCH no-sweeping.

Referring to FIG. 12, N1 subcarriers and M1 symbols may be configured to be present within a PUCCH resource in the case of sweeping, and N2 subcarriers and M2 symbols may be configured to be present within a PUCCH resource in the case of no-sweeping.

In this case, the relation between N1 and N2 satisfies N1≤N2, M1≥M2.

It may be seen that FIG. 12a has higher density than FIG. 12b in the frequency domain of a PUCCH DMRS antenna port.

The third is a method related to a PUCCH channel coding chain, including mapping coded bits to a resource.

For example, in the third method, a channel coding method applied based on the number of beams of a PUCCH is made different.

For example, if sweeping is applied to PUCCH transmission, coded UCI bits (of a high code rate) may be repeated in a symbol unit. If sweeping is not applied to PUCCH transmission, coded UCI bits (of a low code rate) may be spread and mapped to a plurality of symbols.

Alternatively, in the third method, whether to apply interleaving to a channel coding chain or a method of applying interleaving may be different depending on the number of beams of a PUCCH.

For example, if sweeping is applied to a PUCCH, interleaving may be applied to only some symbol sets of a PUCCH. If sweeping is not applied to a PUCCH, interleaving may be applied to all PUCCH symbols. This method is the same as the contents described in the second embodiment. For detailed description, reference is made to the description of the second embodiment.

The fourth is a method regarding transmission power of a PUCCH.

For example, the fourth method is to increase transmission power of a PUCCH as the number of (transmission) beams of a PUCCH increases.

For example, if a PUCCH is transmitted through N symbols and swept using M beams, transmission power of the PUCCH may be increased by taking into consideration (in proportion to) an N/M value, compared to a case where the PUCCH is not swept.

For another example, in the fourth method, in the case of multi-beam-based PUCCH transmission, transmission power of a PUCCH may be differently configured for each beam maintenance time unit.

For example, in Case 2, transmission power of a PUCCH applied to a time unit(s) in which a UE randomly selects and transmits a beam and transmission power of a PUCCH applied to a time unit(s) using a beam that is designated by a base station or that is agreed may be differently configured.

That is, PUCCH power control may be configured for each PUCCH sub-resource or all sub-resources within a PUCCH resource may follow the same power control process.

If all sub-resources within a PUCCH resource follow the same power control process, a power control process is configured in a PUCCH resource unit.

In relation to the transmission power of a PUCCH, a case where transmission power is pre-configured by a base station for each UL beam of a UE may also be taken into consideration.

In such a case, when a plurality of beams is used in a PUCCH, a transmission power parameter pre-configured every symbol set (or time unit) corresponding to each beam may be regulated to be followed.

In this method, however, it the time unit is too short, a power transient loss may occur due to a too frequent change in transmission power.

Furthermore, if a beam is selected by a specific method to be described later, it may be more preferred to equally configure power between the beams of PUCCHs. This is described more specifically in a fourth embodiment.

The specific method means that if a UE uses a plurality of beams for uplink channel transmission, a base station provides RS resource index information (e.g., the best PUCCH DMRS resource/port index(indices)) and/or quality information (e.g., RSRP) of an RS by comparing RS signal quality corresponding to respective UE Tx beams from RSs (e.g., PUCCH DMRSs) used for uplink channel demodulation.

Fourth Embodiment

The fourth embodiment is a method of using transmission power of a PUCCH as the same value in all symbols although a plurality of beams is used for PUCCH transmission when transmission power has been previously configured for each UL beam of a UE.

The same value may be regulated to follow a transmission power value corresponding to an (serving) UL beam designated as a beam to be by a base station, among a plurality of UL beams to be applied to PUCCH transmission, for example, or to follow a transmission power parameter value used for previous PUCCH reporting.

Alternatively, in the third embodiment, as described above, a relative transmission power increase value/decrease value or an absolute transmission power value may be previously regulated based on the number of applied beams of a PUCCH or whether sweeping is applied to a PUCCH.

As described above, if a PUCCH is transmitted using a plurality of beams and a PUCCH DMRS resource is mapped for each beam (as in the first embodiment), such contents may be used for the Tx beam selection or correction of a UE to be used for UL transmission.

Particularly, as in specific method described later, if a plurality of beams is used due to low beam quality, such an UL beam correction process has an effect in that it can reduce signaling overhead and communication latency in that a UE can correct an UL beam even without transmitting a separate UL RS (e.g., sounding RS).

The specific method means that if a UE reports periodic or semi-persistent CSI to a base station, when a link quality level measured from a DL RS drops (to a given level or less), the number of UL Tx beams used for an UL physical channel (e.g., PUCCH) for CSI reporting is increased.

FIG. 13 is a flowchart showing an example of a method of performing PUCCH transmission, which is proposed in this specification.

First, a UE transmits, to a base station, a physical uplink control channel (PUCCH) carrying uplink control information using a plurality of uplink beams (S1310).

In this case, the PUCCH is transmitted through a different uplink beam for each resource unit.

Furthermore, the specific resource unit indicates a resource unit (or resource region or resource interval) by which the PUCCH is transmitted using the same beam, and may include one or more symbols.

Furthermore, the specific resource unit may include the meaning of a time and/or frequency resource unit by which the PUCCH is transmitted using the same beam.

Furthermore, the UE transmits, to the base station, a resource signal (RS) used for the demodulation of the PUCCH using a plurality of uplink beams.

Timing in which the UE transmit the reference signal may be anterior or posterior to step S1310.

In this case, the resource of the reference signal (RS) may be mapped for each resource unit.

Furthermore, the resource of the reference signal may be mapped to all symbols or specific symbol of the specific resource unit.

The resource of the PUCCH and the resource of the reference signal may be determined based on at least one of the number of beams in which the PUCCH is transmitted or whether the PUCCH has been swept.

In this case, the resource of the PUCCH may indicate at least one of a time resource, frequency resource or code resource to which the PUCCH is allocated.

Furthermore, transmission power for the PUCCH may be determined based on at least one of the number of beams in which the PUCCH is transmitted or whether the PUCCH has been swept.

Furthermore, if the PUCCH is transmitted using a plurality of uplink beams, transmission power for the PUCCH may be differently configured for each resource unit.

Furthermore, an uplink beam used for the PUCCH transmission for each resource unit may be indicated by the base station or may be selected by the UE.

In this case, an uplink beam used for the transmission of the reference signal and an uplink beam used for the transmission of the PUCCH in the specific resource unit may be the same.

Furthermore, a PUCCH symbol to which uplink control information is mapped may be determined based on a coding rate used for the uplink control information.

When a coding rate used for the uplink control information is high, the uplink control information may be first mapped to a symbol(s) of the first specific resource unit of the PUCCH resource. The mapped symbol(s) may be continuously repeated and mapped to the PUCCH resource.

On the contrary, when a coding rate used for the uplink control information is low, the uplink control information may be mapped to all the symbols of the PUCCH resource.

Furthermore, when a coding rate used for the uplink control information is low, the uplink control information may be interleaved in all symbols or specific symbol of the PUCCH resource in the time domain.

Furthermore, when a coding rate used for the uplink control information is low, a specific part of the uplink control information may be frequency first mapped, starting from a pre-defined symbol position.

FIG. 14 is a flowchart showing another example of a method of performing PUCCH transmission, which is proposed in this specification.

Specifically, FIG. 14 shows a method of indicating, by a base station, a resource for transmitting a PUCCH using a plurality of uplink beams in FIG. 13. Accordingly, the contents described in FIG. 13 may be identically applied to FIG. 14, except a procedure (S1410 and S1420) of transmitting, by a base station, a resource for transmitting a PUCCH using a plurality of uplink beams.

Referring to FIG. 14, a UE receives, from the base station, a resource for transmitting a PUCCH using a plurality of uplink beams (S1410).

Thereafter, the UE transmits, to the base station, a PUCCH through the plurality of uplink beams in the received resource (S1420).

FIG. 15 is a flowchart showing another example of a method of performing PUCCH transmission, which is proposed in this specification.

Specifically, FIG. 15 shows a method of determining, by a UE, a resource for transmitting a PUCCH using a plurality of uplink beams in FIG. 13. Accordingly, the contents described in FIG. 13 may be identically applied to FIG. 15 except a procedure (S1510 and S1520) of determining, by a UE, a resource for transmitting a PUCCH using a plurality of uplink beams.

Referring to FIG. 15, the UE determines a resource for transmitting a PUCCH using a plurality of uplink beams (S1510).

Thereafter, the UE transmits, to a base station, a PUCCH through the plurality of uplink beams in the determined resource (1520).

General Apparatus to which the Present Invention may be Applied

FIG. 16 illustrates a block diagram of a wireless communication device according to an embodiment of the present invention.

Referring to FIG. 16, a wireless communication system includes an eNB (or network) 1610 and a UE 1620.

The eNB 1610 includes a processor 1611, a memory 1612, and a communication module 1613.

The processor 1611 implements the functions, processes and/or methods proposed in FIGS. 1 to 15. The layers of a wired/wireless interface protocol may be implemented by the processor 1611. The memory 1612 is connected to the processor 1611 and stores various types of information for driving the processor 1611. The communication module 1613 is connected to the processor 1611 and transmits and/or receives wired/wireless signals.

The communication module 1613 may include a radio frequency (RF) unit for transmitting/receiving a radio signal.

The UE 1620 includes a processor 1621, a memory 1622, and a communication module (or the RF unit) 1623. The processor 1621 implements the functions, processes and/or methods proposed in FIGS. 1 to 15. The layers of a radio interface protocol may be implemented by the processor 1621. The memory 1622 is connected to the processor 1621 and stores various types information for driving the processor 1621. The communication module 1623 is connected to the processor 1621 and transmits and/or receives a radio signal.

The memory 1612, 1622 may be positioned inside or outside the processor 1611, 1621 and may be connected to the processor 1611, 1621 by various well-known means.

Furthermore, the eNB 1610 and/or the UE 1620 may have a single antenna or multiple antennas.

FIG. 17 illustrates a block diagram of a communication device according to an embodiment of the present invention.

Particularly, FIG. 17 is a diagram illustrating the UE of more specifically.

Referring to FIG. 17, the UE may include a processor (or digital signal processor (DSP)) 1710, an RF module (or RF unit) 1735, a power management module 1705, an antenna 1740, a battery 1755, a display 1715, a keypad 1720, a memory 1730, a subscriber identification module (SIM) card 1725 (this element is optional), a speaker 1745, and a microphone 1750. The UE may further include a single antenna or multiple antennas.

The processor 1710 implements the function, process and/or method proposed in FIGS. 1 to 15. The layers of a radio interface protocol may be implemented by the processor 1710.

The memory 1730 is connected to the processor 1710, and stores information related to the operation of the processor 1710. The memory 1730 may be positioned inside or outside the processor 1710 and may be connected to the processor 1710 by various well-known means.

A user inputs command information, such as a telephone number, by pressing (or touching) a button of the keypad 1720 or through voice activation using the microphone 1750, for example. The processor 1710 receives such command information and performs processing so that a proper function, such as making a phone call to the telephone number, is performed. Operational data may be extracted from the SIM card 1725 or the memory 1730. Furthermore, the processor 1710 may recognize and display command information or driving information on the display 1715, for convenience sake.

The RF module 1735 is connected to the processor 1710 and transmits and/or receives RF signals. The processor 1710 delivers command information to the RF module 1735 so that the RF module 1735 transmits a radio signal that forms voice communication data, for example, in order to initiate communication. The RF module 1735 includes a receiver and a transmitter in order to receive and transmit radio signals. The antenna 1740 functions to transmit and receive radio signals. When a radio signal is received, the RF module 1735 delivers the radio signal so that it is processed by the processor 1710, and may convert the signal into a baseband. The processed signal may be converted into audible or readable information output through the speaker 1745.

The aforementioned embodiments have been achieved by combining the elements and characteristics of the present invention in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative, but should be construed as being illustrative from all aspects. The scope of the present invention should be determined by reasonable analysis of the attached claims, and all changes within the equivalent range of the present invention are included in the scope of the present invention.

INDUSTRIAL APPLICABILITY

The present invention has been illustrated based on an example in which it is applied to the 3GPP LTE/LTE-A system and 5G, but may be applied to various wireless communication systems in addition to the 3GPP LTE/LTE-A system and 5G.

The invention claimed is:

1. A method of transmitting, by a user equipment (UE), a physical uplink control channel (PUCCH) carrying uplink control information (UCI) containing channel quality information (CQI) feedback in a wireless communication system, the method comprising:
    transmitting, to a base station (BS), a reference signal (RS) for demodulating the PUCCH, using a plurality of uplink beams,
    transmitting, to the BS, the PUCCH using the plurality of uplink beams,
    wherein each of the plurality of uplink beams corresponds to a different one of a plurality of specific resource units, respectively, and in each of the plurality of specific resource units, the RS and the PUCCH are transmitted through the corresponding uplink beam, and
    wherein each specific resource unit indicates a specific number of orthogonal frequency division multiplexing (OFDM) symbols for that specific resource unit in which the corresponding uplink beam for transmitting the PUCCH and RS remains the same,
    wherein the UCI is coded at a specific coding rate, the coded UCI is mapped to the specific number of OFDM symbols and the mapping of the coded UCI is repeated within a PUCCH resource in which the PUCCH is transmitted,
    wherein a lower quality CQI feedback is coded at a higher coding rate and mapped to greater number of OFDM symbols by increasing the number of PUCCH beams or by PUCCH beam sweeping.

2. The method of claim 1, wherein the RS is mapped to all or part of the OFDM symbols in each of the specific resource units.

3. The method of claim 1, wherein interleaving related to the coded UCI is performed in all the OFDM symbols or specific OFDM symbol of the PUCCH resource.

4. The method of claim 1,
    wherein the specific number of OFDM symbols is based on at least one of a number of the plurality of uplink beams or whether a beam sweeping operation is performed, and
    wherein any sweeping operation is based on a beam sweeping operation that one of a plurality of beams for a signal transmission applied during a pre-defined time interval.

5. The method of claim 1,
    wherein transmission power for the PUCCH is determined based on at least one of a number of the plurality of uplink beams or whether a beam sweeping operation is performed, and
    wherein any sweeping operation is based on a beam sweeping operation that a plurality of beams is applied for a signal transmission during a pre-defined time interval.

6. The method of claim 5, wherein the transmission power for the PUCCH is differently configured for each of the specific resource units.

7. The method of claim 1, wherein the uplink beam used for the PUCCH transmission for each of the specific resource units is indicated by the BS or selected by the UE.

8. A user equipment transmitting a physical uplink control channel (PUCCH) carrying uplink control information (UCI) containing channel quality information (CQI) feedback in a wireless communication system, the user equipment comprising:
- a transmitter and receiver configured to transmit and receive radio signals; and
- a processor functionally connected to the transmitter and receiver, wherein the processor is configured to:
- transmit, to a base station (BS), a reference signal (RS) for demodulating the PUCCH, using a plurality of uplink beams,
- transmit, to the BS, the PUCCH using the plurality of uplink beams, wherein each of the plurality of uplink beams corresponds to a different one of a plurality of specific resource units, respectively, and in each of the plurality of specific resource units, the RS and the PUCCH are transmitted through the corresponding uplink beam, and resource unit indicates a specific number of orthogonal frequency division multiplexing (OFDM) symbols for that specific resource unit in which the corresponding uplink beam for transmitting the PUCCH and RS remains the same, wherein the UCI is coded at a specific coding rate, the coded UCI is mapped to the specific number of OFDM symbols and the mapping of the coded UCI is repeated within a PUCCH resource in which the PUCCH is transmitted, wherein a lower quality CQI feedback is coded at a higher coding rate and mapped to greater number of OFDM symbols by increasing the number of PUCCH beams or by PUCCH beam sweeping.

\* \* \* \* \*